United States Patent Office 3,341,411
Patented Sept. 12, 1967

3,341,411
7α,17,17-TRIMETHYL-18-NOR-Δ$^{13(14)}$-STEROIDS
OF THE ANDROSTANE SERIES
J. Allan Campbell and John C. Babcock, Kalamazoo, Mich., assignors to The Upjohn Company, Kalamazoo, Mich., a corporation of Delaware
No Drawing. Filed Apr. 7, 1965, Ser. No. 446,384
14 Claims. (Cl. 167—65)

This invention relates to novel steroid compounds, especially to 7α,17,17-trimethyl-18-nor-4,13(14)-androstadiene, its corresponding 4-saturated, 2α-methyl, 4(α and β)-methyl, 2α,4(α and β)-dimethyl derivatives and the 19-nor counterparts of the foregoing compounds having the formula

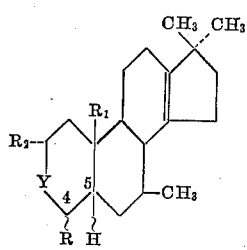

wherein ʃ is a generic expression denoting α- and β-bonds and mixtures thereof; the 4(5)-carbon atom linkage is selected from the group consisting of single bonds and double bonds, with the proviso that the 5-hydrogen atom is absent when the 4(5)-carbon atom linkage is a double bond; R, $R_1$ and $R_2$ are selected from the group consisting of hydrogen and methyl; Y is selected from the group consisting of the methylene radical ($>CH_2$), the carbonyl radical ($>C=O$),

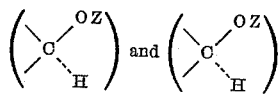

Z being selected from the group consisting of hydrogen, acyl and tetrahydropyranyl.

The compounds of the present invention and the processes for their production are illustratively represented by the following sequence of formulae:

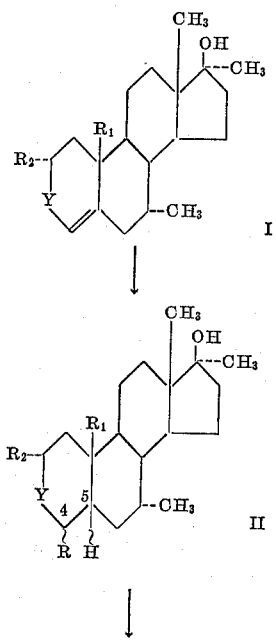

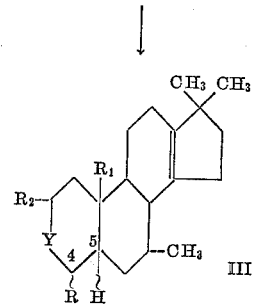

wherein ʃ, 4(5), R, $R_1$, $R_2$ and Y have the same meaning as above.

The compounds of Formula III of the present invention have anabolic activity of improved therapeutic ratio of the former versus the latter. They also possess anti-fertility, anti-androgenic and anti-estrogenic activities. They exhibit CNS-regulating activity and antimicrobial properties. They also have the ability to reduce the level of cholesterol, decrease platelet adhesiveness, and decrease clot lysis time in the blood and consequently are of therapeutic value in the treatment or prevention of atherosclerosis and thromboembolic disease. The foregoing properties make the new compounds useful in medical and veterinary practice.

The compounds of Formula III of the invention can be prepared and administered to mammal, birds, humans, and animals, in a wide variety of oral or parenteral dosage forms, singly or in admixture with other coacting compounds. They can also be administered with a pharmaceutical carrier which can be a solid material or a liquid in which the compound is dissolved, dispersed or suspended. The solid compositions can take the form of tablets, powders, capsules, pills, or the like, preferably in unit dosage forms for simple administration or precise dosages. The liquid compositions can take the form of solutions, emulsions, suspensions, syrups, or elixirs.

The novel compounds of this invention, embraced by Formula III of the above flow-sheet, are prepared by subjecting the steroids of Formula II to acid catalyzed (Wagner-Meerwein) rearrangement.

The Δ$^{13}$-17,17-dimethyl compounds (III) are prepared from the corresponding 13-saturated -17α-methyl-17β-hydroxy compounds (II) by the heating of the latter (e.g., at refluxing temperatures) in an inert organic solvent such as methanol, ethanol, dioxane or other water miscible solvent, in the presence of an acid (e.g., hydrochloric, sulfuric or hydrobromic) for a prolonged period (e.g., from about 3 to about 6 hours), preferably in an inert atmosphere such as nitrogen. The products (III) are recovered by conventional procedures such as crystallization or chromatography, or a combination of these.

The 7α,17,17-trimethyl compounds of Formula III of the invention are prepared from the known 7α-methyl-4-androstene starting materials of Formula I, which are synthesized in the manner described in J. Amer. Chem. Soc. 81, 4069. The corresponding 2α,7α-dimethyl compounds (I) are produced in accordance with the procedures of U.S. Patent 2,923,720.

The methods for obtaining the compounds of Formula II from those of Formula I are set forth below.

The starting materials of Formula I are readily reduced by known methods to the corresponding 7α,17α-dimethyl (and 2α,7α,17α-trimethyl)-3(α and β)-hydroxy-5(α and β)-androstanes (II). These methods can be employed to produce the 3α-hydroxy-5β-androstanes, 3β-hydroxy-5α-androstanes, 3α-hydroxy-5β-androstanes and 3β-hydroxy-5β-androstanes embraced by Formula I.

The α,β-unsaturated ketones (I) can be reduced with metal (preferably lithium) in ammonia to yield the corresponding 3-keto-5α-androstanes (II) and the reduction stopped at this stage if reagents such as t-butyl alcohol or ammonium chloride are employed at the end of the reaction (in the manner described in J. Amer. Chem. Soc., 81, 2386 for the conversion XX→XXV). The same publication shows that continued treatment following the addition of methanol instead of t-butyl alcohol or ammonium chloride, leads directly to the saturated 3β-hydroxy-5α-androstanes (II). For example, when the reduction of a compound such as 7α-methyl-17β-hydroxy-4-androsten-3-one (I), e.g., with lithium in ammonia, is discontinued at the point where 7α-methyl-17β-hydroxy-5α-androstan-3-one (II) is formed, it can be further reduced (e.g., with sodium borohydride) to yield 7α-methyl-3β,17β-dihydroxy-5α-androstane (II). On the other hand, the reduction of a 3-keto-4-androstene (I) directly to the corresponding 3β-hydroxy-5α-androstane (II), without isolation of the 3-keto-5α-androstan-3-one (II), can be carried out in accordance with the above-noted publication.

The 3-keto-7α-methyl (and 2α,7α-dimethyl)-5α-androstanes (II) can be reduced to yield a mixture of 3(α and β)-hydroxy-5α-androstanes (II). For example, treating a 7α,17α-dimethyl-17β-hydroxy-5α-androstan-3-one 17-acylate (II) with lithium aluminum tri-t-butyoxyhydride in a solvent (e.g., tetrahydrofuran) yields a corresponding 7α,17α - dimethyl - 3α,17α-dihydroxy-5α-androstan 17-acylate (II) and a corresponding 7α,17α-dimethyl-3β,17α-dihydroxy-5α-androstane 17-acylate (II).

Most of the metal (lithium)-ammonia reductions of the 3-keto-4-androstenes (I) are conducted in the presence of co-solvents such as ether, dioxane or tetrahydrofuran.

Conversion of the compounds of Formula I to a variety of 3(α and β)-hydroxy-5α-androstanes can be carried out by procedures known in the steroid art. For example, after reduction of a compound of Formula I, such as a 7α,17α-dimethyl-17β-hydroxy-4-androsten-3-one 17-acylate (I), e.g., with lithium in ammonia in a solvent such as tetrahydrofuran, to yield a compound of Formula II, such as a corresponding 7α,17α-dimethyl-17β-hydroxy-5α-androstan-3-one 17-acylate (II), the thus produced compound (II) is treated with a reducing agent to obtain compounds such as a corresponding 7α,17α-dimethyl-3α,17β-dihydroxy-5α-androstane 17-acylate (II) and a corresponding 7α,17α - dimethyl-3β,17β-dihydroxy-5α-androstane 17-acylate (II).

The conversion of the 3-ketone of Formula II to the corresponding 3(α and β)-hydroxy compounds is carried out using a reducing agent, for example, lithium tri-t-butoxyhydride, lithium aluminum triethoxyhydride, sodium borohydride, potassium borohydride, diborane, and the like, in an inert organic solvent, for example, tetrahydrofuran, ether, diethyleneglycol dimethyl ether, and the like. Advantageously, the reaction is carried out at temperatures of from 0° to 100° C. for from about ¼ to about 2 hours, with a temperature of 25° C. for about ½ hour being preferred. The 3(α and β)-hydroxy compounds of Formula II are recovered following their formation by fractional crystallization, chromatography of the total crude reaction product on acid washed alumina, Florisil (synthetic aluminum silicate), silica gel (precipitated silicic acid granules), or silicic acid, with elution by commercial hexanes containing increasng amounts of acetone or benzene containing increasing amounts of methanol, Craig countercurrent partition separation, column partition chromatography, preparative paper chromatography, thin-layer chromatography, or a combination of these methods.

The conversion of the compounds of Formula II, such as a 7α,17α-dimethyl-3α,17β-dihydroxy-5α-androstane 17-acylate, and a 7α,17α-dimethyl-3β,17β-dihydroxy-5α-androstane 17-acylate, to the corresponding 17β-hydroxy compounds such as 7α,17α-dimethyl-3α,17β-dihydroxy-5α-androstane and 7α,17α-dimethyl-3β,17β-dihydroxy-5α-androstane, is carried out according to procedures well known in the art for the conversion of androstane 17-acylates to androstane 17-alcohols as shown in U.S. Patent 2,849,464.

The 7α,17α-dimethyl (and 2α,7α,17α-trimethyl)-3-keto-4-androstene compounds of Formula I, can be converted to the corresponding 5β-androstanes (II) by hydrogenation of the Δ⁴-bond. For example, treating a compound such as 2α,7α,17α-trimethyl-17β-hydroxy-4-androsten-3-one (I) in a solvent (e.g., 95% ethyl alcohol) in the presence of a catalyst (e.g., 5% palladium on charcoal) with hydrogen until one mole equivalent is consumed, yields a compound such as 2α,7α,17α-trimethyl-17β-hydroxy-5β-androstan-3-one (II). Isolation of the desired compound from the reaction mixture and its subsequent purification is accomplished by methods well known in the art. For example, the catalyst is removed from the reaction mixture by filtration through a bed of Celite (diatomaceous earth), the filtrate concentrated to dryness, chromatographed on an adsorbent column (e.g., Florisil), eluted with solvents such as acetone-Skellysolve B (hexanes) and recrystallized from solvents such as the aforesaid pair of eluants.

The 7α,17α-dimethyl (and 2α,7α,17α-trimethyl)-3-keto-5β-androstanes of Formula II can be converted to the corresponding 3α-hydroxy-5β-androstanes (II') by hydrogenation of the 3-keto group. For example, treating a compound such as 2α,7α,17α-trimethyl-17β-hydroxy-5β-androstan-3-one (II) in a solvent (e.g., tetrahydrofuran) with a reducing agent (e.g., lithium aluminum tri-t-butoxyhydride) or sodium borohydride at low temperature (e.g., 0° C.), with agitation (e.g., stirring), yields a compound such as 2α,7α,17α-trimethyl-3α,17β-dihydroxy-5β-androstane (II). The reaction mixture containing the desired compounds of Formula II' is stored at low temperature (e.g., −15° C.) for about 18 hours. Dilute acetic acid is added until the inorganic materials are coagulated. The organic phase is decanted, dried over a dehydrating agent such as magnesium sulfate, filtered, concentrated to dryness and recrystallized from solvent to yield the 3α-hydroxy-5α-androstane (II), or alternatively, purified by chromatography with a Florisil column.

In order to produce the 3-desoxy compounds of Formula II, wherein the 5-hydrogen atom is α-oriented, the 3-oxygenated compounds are first converted to their corresponding 3-thioketal derivatives in the manner of J. Amer. Chem. Soc. 76, 1945, namely, by reaction with an alkanedithiol (such as ethanedithiol) in the presence of an organic acid and a strong Lewis acid catalyst (e.g., boron trifluoride etherate); desulfurization is accomplished by hydrogenation of the 3-thioketal group (e.g., with sodium metal in liquid ammonia or with hydrogen in the presence of a catalyst such as Raney nickel) to yield a corresponding 3-desoxy compound (II), such as 7α,17α-dimethyl-19-nor-17β-hydroxy-5α-androstane (II).

To produce the 3-desoxy-5β-androstanes of Formula II, the 4-androstenes of Formula I are first converted to their corresponding 3-thioketal derivatives followed by desulfurization (in the same manner as in the immediately preceding paragraph) to yield a compound such as 7α,17α - dimethyl - 19-nor-17β-hydroxy-4-androstene. A thus produced 3-desoxy-Δ⁴-steroid can be dissolved in a solvent (e.g., 95% alcohol) with a catalyst such as 5% palladium on charcoal or Adams (platinum dioxide) catalyst, and hydrogenated until one mole equivalent of hydrogen is consumed to yield a compound such as 7α,17α-dimethyl-19-nor-17β-hydroxy-5β-androstane (II). The catalyst is filtered off and the filtrate concentrated to dryness. The residue of the 5β-hydrogen compound (II) is purified by recrystallization or chromatography with a column of Florisil.

A compound of Formula II, such as 7α,17α-dimethyl-3α,17β-dihydroxy-5α-androstane 17-acylate (II) can be transformed to a corresponding 3-dihydropyranyl ether (II) by the two following reactions.

(1) The conversion of a compound of Forumla II, such as 7α,17α-dimethyl-3α,17β-dihydroxy-5α-androstane 17-acylate, to compounds such as 7α,17α-dimethyl-3α,17β-dihydroxy-5α-androstane 3-dihydropyranyl ether 17-acylate (II) is carried out by reacting a corresponding compound of Formula II with dihydropyran in the presence of a Lewis acid, such as boron trifluoride etherate, p-toluenesulfonic acid, sulfuric acid, zinc chloride, phosphorous oxychloride, and the like. Advantageously, the reaction can be carried out in an organic solvent, such as ether, benzene, and the like. The reaction is carried out at temperatures of from about 0° C. to about 80° C., with a temperature of 25° C. being preferred. The thus obtained 3-dihydropyranyl ether 17-acylate compounds of Formula II are recovered from the reaction mixture by conventional methods such as, for example, dilution of the reaction mixture with water, extraction with a water immiscible solvent, such as methylene chloride, ethyl acetate, benzene, toluene and the like, or any of the methods described above for the recovery of the 3(α and β)-hydroxy compounds of Formula II. Alternatively, the entire crude product obtained in this reaction (1) can be used in the subsequent hydrolysis of step (2).

(2) The hydrolysis of the compounds of Formula II, such as 7α,17α-dimethyl-3α,17β-dihydroxy-5α-androstane 3-dihydropyranyl ether 17-acylate, to compounds such as 7α,17α-dimethyl-3α,17β-dihydroxy-5α-androstane 3-dihydropyranyl ether, is carried out in an alkaline aqueous medium using relatively water soluble alkali metal carbonates, alkaline earth metal carbonates, alkali metal hydroxides, alkaline earth hydroxides, e.g., sodium or potassium carbonate, sodium or potassium hydroxide, calcium hydroxide, and the like, preferably potassium hydroxide. Advantageously, there is added to the alkaline aqueous medium an inert water-miscible organic solvent, such as methanol, ethanol, isopropyl alcohol and the like, with methanol being preferred. The reaction is carried out at temperatures of about 10° C. to about 100° C. for from about 1 to about 20 hours. The 3-dihydropyranyl ether-17β-hydroxy compounds of Formula II are recovered from the reaction mixture by the methods described above for the recovery of the corresponding 17-acylate compounds of Formula II.

The 4,7α,17,17-tetramethyl compounds of Formula III of the invention are prepared from the known 7α-methyl-4-androstene starting materials of Formula I, which are synthesized in the manner described in J. Amer. Chem. Soc. 81, 4069. The corresponding 2α,7α-dimethyl starting compounds (I) are produced in accordance with the procedures of U.S. Patent 2,923,720.

The 4,7α,17α-trimethyl and 2α,4,7α,17α-tetramethyl compounds of Formula II, wherein the 4(5)-carbon atom linkage is a double bond, are prepared in accordance with Canadian Patent No. 676,599 and Australian Patent No. 244,970. A 3-oxo-Δ⁴-starting steroid of Formula I is condensed with formaldehyde or paraformaldehyde and a thiol in the presence of a basic catalyst to yield a corresponding 4-organothiomethyl-3-oxo-Δ⁴-steroid (I'). It is not necessary to isolate the 4-organothiomethyl compounds (I') in crystalline form, as they are generally formed in high yield, so that the total product can be employed in a desulfurization step resulting in the production of the various 4-methylated compounds embraced by Formula II.

Desulfurization of the 4-organothiomethyl intermediates (I') can be carried out by treating a solution of the organothiomethyl compound with Raney nickel of a suitable reactivity. The preferred solvent is acetone, but other ketonic solvents such as butan-2-one or cyclohexanone can be employed, either alone or diluted with an inert solvent such as a lower alkanol containing up to 5 carbon atoms. The reactivity of the Raney nickel must first be adjusted so as to prevent saturation of the 4:5-ethylenic linkage, which may occur if a highly active Raney nickel is used. Raney nickel, as ordinarily prepared, may be suitably deactivated by preliminary heating in the ketonic solvent, preferably acetone, in which the desulfurization is to be effected, preferably in a slow stream of nitrogen to facilitate removal of the hydrogen gas which is evolved from the nickel. The thiomethyl compound (I') is then added to the suspension of the deactivated Raney nickel, and heating is continued until desulfurization is completed, when the corresponding 4,7α,17α-trimethyl or 2α,4,7α,17α-tetramethyl-17β-hydroxy-3-oxo-Δ⁴-steroid (II) can be isolated, for example, by filtration to remove the nickel and evaporation of the filtrate.

When the thiomethyl compound (I') contains a readily oxidizable hydroxyl group, such as a 17β-hydroxyl group, it is advisable to protect this group by formation of a derivative such as the acetate or propionate prior to the desulfurization reaction, in order to avoid partial oxidation of the hydroxyl group to an oxo group, which may occur, with concomitant reduction of a part of the ketonic solvent to the corresponding alcohol, under the catalytic influence of Raney nickel. The hydroxyl group can be regenerated after desulfurization, if desired, by hydrolysis of the ester, for example, with alcoholic alkali.

An alternative method for converting the compounds of Formula I to the corresponding 4-alkyl derivatives (II) is described in U.S. Patent 3,070,612. In accordance with the process disclosed therein, the starting materials of this application, such as 7α,17α-dimethyl-17β-hydroxy-4-androsten-3-one (I), or the 2α-methyl counterpart (I) thereof, can be treated with a secondary cyclic amine to produce the 3-enamine of the corresponding starting material. The 3-enamine thus produced can then be reacted with an alkylating agent to produce the 4-alkyl-3-enamine of the corresponding starting material; these compounds on hydrolytic removal of the enamine group yield the corresponding 4-alkyl-3-keto compounds, i.e., the 4-alkyl-7α,17α-dimethyl-17β-hydroxy-4-androsten-3-ones (II) or the 2α-methyl counterpart thereof (II).

In order to produce the Δ⁴-3-desoxy compounds of Formula II, the Δ⁴-3-keto compounds of Formula II are first converted to their corresponding 3-thioketal derivatives in the manner of J. Amer. Chem. Soc. 76, 1945, namely, by reaction with an alkanedithiol (such as ethanedithiol) in the presence of an organic acid and a strong Lewis acid catalyst (e.g., boron trifluoride etherate); desulfurization is accomplished by hydrogenation of the 3-thioketal group (e.g., with sodium metal in liquid ammonia or with hydrogen in the presence of a catalyst such as Raney nickel) to yield a corresponding 3-desoxy compound (II), such as 4,7α,17α-trimethyl-19-nor-17β-hydroxy-4-androstene (II).

The 4,7α,17α-trimethyl-17β-hydroxy-4-androsten-3-ones (II) and 2α,4,7α,17α-tetramethyl-17β-hydroxy-4-androsten-3-ones (II), produced as above, are readily reduced by known methods to the corresponding 4(α and β),7α,17α-trimethyl-17β-hydroxy-5(α and β)-androstan-3-ones (II) and 2α,4(α and β),7α,17α-tetramethyl-17β-hydroxy-5(α and β)-androstan-3-ones (II); further reduction yields the corresponding 3(α and β)-hydroxides (II). The foregoing 4(α and β),7α,17α-trimethyl and 2α,4(α and β),7α,17α-tetramethyl-5(α and β)-androstanes embraced within Formula II of the flow-sheet, above, can be converted to the steroids included within Formula III therein, in the manner described above.

The α,β-unsaturated ketones (II) can be reduced with metal (preferably lithium) in ammonia to yield the corresponding 3-keto-5α-androstanes (II) and the reduction stopped at this stage if reagents such as t-butyl alcohol or ammonium chloride are employed at the end of the reaction (in the manner described in J. Amer. Chem. Soc. 81, 2386 for the conversion XX→XXV). The same publication shows that continued treatment following the addition of methanol instead of t-butyl alcohol or ammonium chloride, leads directly to the saturated 3β-hydroxy-5α- androstanes (II). For example, when the reduction of a compound such as a 4(α and β),7α,17α-trimethyl-17β-hydroxy-4-androstene-3-one (II), e.g., with lithium in ammonia, is discontinued at the point where a 4(α and β), 7α,17α-trimethyl-17β-hydroxy-5α-androstan-3-one (II) is formed, it can be further reduced (e.g., with sodium borohydride), to yield a 4(α and β), 7α,17α-trimethyl-3β,17β-dihydroxy-5α-androstane (II). On the other hand, the reduction of a 3-keto-4-androstene (II) directly to the corresponding 3β-hydroxy-5α-androstane (II), without isolation of the 3-keto-5α-androstan-3-one (II), can be carried out in accordance with the above-noted publication.

The 3-keto-4 (α or β,)7α,17α-trimethyl(and 2α,4[α or β],7α,17α-tetramethyl)-5α-androstanes (II) can be reduced to yield a mixture of 3(α and β)-hydroxy-5α-androstanes (II). For example, treating a 4(α or β), 7α,17α-trimethyl-17β-hydroxy-5α-androstan-3-one 17-acylate (II) with lithium aluminum tri-t-butoxyhydride in a solvent (e.g., tetrahydrofuran) yields a corresponding 4(α or β),7α,17α-trimethyl-3α,17α - dihydroxy-5α-androstane 17-acylate (II) and a corresponding 4(α or β),7α,17α-trimethyl-3β,17α-dihydroxy-5α-androstane 17-acylate (II).

Most of the metal (lithium)-ammonia reductions of the 3-keto-4-androstenes (II) are conducted in the presence of co-solvents such as ether, dioxane or tetrahydrofuran.

Conversion of the Δ⁴-compounds of Formula II to a variety of 3(α and β)-hydroxy-5α-androstanes can be carried out by procedures known in the steroid art. For example, after reduction of a Δ⁴-compound of Formula II, such as a 4(α or β), 7α,17α-trimethyl-17β-hydroxy-4-androsten-3-one 17-acylate (II), e.g., with lithium in ammonia in a solvent such as tetrahydrofuran, to yield a compound of Formula II, such as a corresponding 4(α or β),7α,17α-trimethyl-17β - hydroxy-5α-androstan-3-one 17-acylate (II), the thus produced compound is treated with a reducing agent to obtain compounds such as a corresponding 4(α or β),7α,17α-trimethyl-3α,17β-dihydroxy-5α-androstane 17-acylate (II) and a corresponding 4(α or β),7α,17α-trimethyl-3β,17β - dihydroxy-5α-androstane 17-acylate (II).

The conversion of the 3-ketones of Formula II to the corresponding 3(α and β)-hydroxy compounds (II) is carried out using a reducing agent, for example, lithium tri-t-butoxyhydride, lithium aluminum triethoxyhydride, sodium borohydride, potassium borohydride, diborane, and the like, in an inert organic solvent, for example, tetrahydrofuran, ether, diethyleneglycol dimethyl ether, and the like. Advantageously, the reaction is carried out at temperatures of from 0° to 100° C. for from about ¼ to about 20 hours, with a temperature of 25° C. for about ½ hour being preferred. The 3(α and β)-hydroxy compounds of Formula II are recovered following their formation by fractional crystallization, chromatography of the total crude reaction product on acid washed alumina, Florisil (synthetic aluminum silicate), silica gel (precipitated silicic acid granules), or silicic acid, with elution by commercial hexanes containing increasing amounts of acetone or benzene containing increasing amounts of methanol, Craig countercurrent partition separation, column partition chromatography, preparative paper chromatography, thin-layer chromatography, or a combination of these methods.

The conversion of the compounds of Formula II, such as a 4(α or β),7α,17α-trimethyl-3α,17β-dihydroxy-5α-androstane 17-acylate and a 4(α or β),7α,17α-trimethyl-3β,17β-dihydroxy-5α-androstane 17-acylate to the corresponding 17β-hydroxy compounds such as 4(α or β),7α,17α-trimethyl-3α,17β-dihydroxy-5α-androstane and 4(α or β), 7α,17α-trimethyl-3β,17β-dihydroxy-5α-androstane, is carried out according to procedures well known in the art for the conversion of androstane 17-acylates to androstane 17-alcohols as shown in U.S. Patent 2,849,464.

A compound such as 4(α or β),7α,17α-trimethyl-3α,17β-dihydroxy-5α-androstane 17-acylate (II) can be transformed to a corresponding 3-dihydropyranyl ether (II) by the two following reactions.

(1) The conversion of a compound of Formula II, such as 4(α or β),7α,17α-trimethyl-3α,17β-dihydroxy-5α-androstane 17-acylate, to compounds such as 4(α or β), 7α,17α-trimethyl-3α,17β-dihydroxy-5α-androstane 3-dihydropyranyl ether 17-acylate (II) is carried out by reacting a corresponding 3(α or β)-hydroxy compound with dihydropyran in the presence of a Lewis acid, such as boron trifluoride etherate, p-toluenesulfanic acid, sulfuric acid, zinc chloride, phosphorous oxychloride, and the like. Advantageously, the reaction can be carried out in an organic solvent, such as ether, benzene, and the like. The reaction is carried out at temperatures of from about 0° C. to about 80° C., with a temperature of 25° C. being preferred. The thus obtained 3-dihydropyranyl ether 17-acylate compounds of Formula II are recovered from the reaction mixture by conventional methods such as, for example, dilution of the reaction mixture with water, extraction with a water immiscible solvent, such as methylene chloride, ethyl acetate, benzene, toluene and the like, or any of the methods described above for the recovery of the 3(α and β)-hydroxycompounds of Formula II. Alternatively, the entire crude product obtained in this reaction (1) can be used in the subsequent hydrolysis of step (2).

(2) The hydrolysis of the compounds of Formula II, such as 4(α or β),7α,17α-trimethyl-3α,17β-dihydroxy-5α-androstane 3-dihydropyranyl ether 17-acylate, to compounds such as 4(α or β),7α,17α-trimethyl-3α,17β-dihydroxy-5α-androstane 3-dihydropyranyl ether, is carried out in an alkaline aqueous medium using relatively water soluble alkali metal carbonates, alkaline earth metal carbonates, alkali metal hydroxides, alkaline earth hydroxides, e.g., sodium or potassium carbonate, sodium or potassium hydroxide, calcium hydroxide, and the like, preferably potassium carbonate. Advantageously, there is added to the alkaline aqueous medium an inert water-miscible organic solvent, such as methanol, ethanol, isopropyl alcohol and the like, with methanol being preferred. The reaction is carried out at temperatures of about 10° C. to about 100° C. for from about 1 to about 20 hours. The 3-dihydropyranyl ether-17β-hydroxy compounds of Formula II are recovered from the reaction mixture by the methods described above for the recovery of the corresponding 17-acylates of Formula II.

The 4(α or β),7α,17α-trimethyl(and 2α,4[α or β],7α, 17α-tetramethyl)-3-keto-4-androstene compounds of Formula II can be converted to the corresponding 5β-androstanes (II) by hydrogenation of the Δ⁴-bond. For example, treating a compound such as 2α,4(α or β),7α, 17α-tetramethyl-17β-hydroxy-4-androstene-3-one (II) in a solvent (e.g., 95% ethyl alcohol) in the presence of a catalyst (e.g., 5% palladium on charcoal) with hydrogen until one mole equivalent is consumed, yields a compound such as 2α,4(α or β),7α,17α-tetramethyl-17β-hydroxy-5β-androstan-3-one (II). Isolation of the desired compound from the reaction mixture and its subsequent purification is accomplished by methods well known in the art. For example, the catalyst is removed from the reaction mixture by filtration through a bed of Celite (diatomaceous earth), the filtrate concentrated to dryness, chromatographed on an adsorbent column (e.g., Florisil), eluated with solvents such as acetone-Skellysolve B (hexanes) and recrystallized from solvents such as the aforesaid pair of eluants.

The 4(α or β),7α,17α-trimethyl (and 2α,4[α or β],7α, 17α-tetramethyl)-3-keto-5β-androstanes of Formula II can be converted to the corresponding 3α-hydroxy-5β-androstanes (II) by hydrogenation of the 3-keto group. For example, treating a compound such as 2α,4(α or β), 7α,17α-tetramethyl-17β-hydroxy-5-β-androstan-3-one (II) in a solvent (e.g., tetrahydrofuran) with a reducing agent (e.g., lithium aluminum tri-t-butoxyhydride) at low temperature (e.g., 0° C.), with agitation (e.g., stirring).

yields a compound such as 2α,4(α or β),7α,17α-tetramethyl-3α,17β-dihydroxy-5-androstane (II). The reaction mixture containing the desired 3α-hydroxy compounds for Formula II is stored at low temperature (e.g., −15° C.) for about 18 hours. Dilute acetic acid is added until the inorganic materials are coagulated. The organic phase is decanted, dried over a dehydrating agent such as magnesium sulfate, filtered, concentrated to dryness and recrystallized from solvent to yield the 3α-hydroxy-5α-androstane (II), or alternatively, purified by chromatography with a Florisil column.

In order to produce the 3-desoxy-5α-androstane compounds of Formula II, the 5α-androstane compounds of Formula II are first converted to their corresponding 3-thioketal derivatives in the manner of J. Amer. Chem. Soc. 76, 1945, namely, by reaction with an alkanedithiol (such as ethanedithiol) in the presence of an organic acid and a strong Lewis acid catalyst (e.g., boron trifluoride etherate); desulfurization is accomplished by hydrogenation of the 3-thioketal group (e.g., with sodium metal in liquid ammonia or with hydrogen in the presence of a catalyst such as Raney nickel) to yield a corresponding 3-desoxy compound (II), such as 4(α or β),7α,17α-trimethyl-19-nor-17β-hydroxy-5α-androstane (II).

To produce the 3-desoxy-5β-androstanes of Formula II, the 4-androstenes of Formula II are first converted to their corresponding 3-thioketal derivatives followed by desulfurization (in the same manner as in the immediately preceding paragraph) to yield a compound such as 4(α or β),7α,17α-trimethyl-19-nor-17β-hydroxy-4-androstene. A thus produced 3-desoxy-Δ4-steroid can be suspended in a solvent (e.g., 95% alcohol) with a catalyst such as 5% palladium on charcoal, or Adams (platinum dioxide) catalyst, and hydrogenated until one mole equivalent of hydrogen is consumed to yield a compound such as 4(α or β),7α,17α-trimethyl-19-nor-17β-hydroxy-5β-androstane (II). The catalyst is filtered off and the filtrate concentrated to dryness. The residue of the 5β-hydrogen compound (II) is purified by recrystallization or chromatography with a column of Florisil.

EXAMPLE 1

*7α,17α-dimethyl-17β-hydroxy-5β-androstan-3-one (II)*

A solution of 1 g. of 7α,17α-dimethyl-17β-hydroxy-4-androstan-3-one (7α,17α-dimethyltestosterone) (I) (prepared as in J. Amer. Chem. Soc. 81, 4069) in 250 ml. of 95% ethyl alcohol is reacted with hydrogen using 5% palladium on charcoal catalyst until 1 mole equivalent of hydrogen is absorbed. The catalyst is removed by filtration through a bed of Celite (diatomaceous earth). The filtrate is concentrated to dryness, chromatographed through a Florisil column and recrystallized from a mixture of acetone and Skellysolve B to give 7α,17α-dimethyl-17β-hydroxy-5β-androstan-3-one (I).

Following the procedure of Example 1, but substituting for 7α,17α-dimethyl-17β-hydroxy-4-androsten-3-one (I), the following representative starting materials:

(1) 7α,17α-dimethyl-19-nor-17β-hydroxy-4-androsten-3-one (I) and
(2) 7α,17α-dimethyl-19-nor-17β-hydroxy-4-androsten-3-one-17-acetate (I), yields respectively, (1) 7α,17α-dimethyl-19-nor-17β-hydroxy-5β-androstan-3-one (II) and
(2) 7α,17α-dimethyl-19-nor-17β-hydroxy-5β-androstan-3-one-17-acetate (II).

EXAMPLE 2

*2α,7α,17α-trimethyl-17β-hydroxy-4-androsten-3-one (I)*

(a) To a solution of 50 g. of 7α,17α-dimethyl-17β-hydroxy-4-androsten-3-one (7α,17α-dimethyltestosterone) (I) (prepared as in J. Amer. Chem. Soc. 81, 4069) in 750 ml. of t-butyl alcohol, warmed to 55° C. in a nitrogen atmosphere, 50 ml. of ethyl oxalate and 65 ml. of 25% sodium methoxide solution was added with stirring. Stirring was continued for about 20 minutes after which 750 ml. of ether was added. The mixture was filtered and the solid off-yellow glyoxalate dried in a vacuum oven to give 46 g. of crude material. A mixture of the crude glyoxalate, 150 g. of potassium carbonate, 150 ml. of methyl iodide and 1250 ml. of acetone was stirred and heated under reflux for about 24 hours. Approximately 500 ml. of liquid was distilled off and the remaining mixture filtered. The filter cake was washed with acetone and the combined mixture filtered. The cake was washed with additional acetone and the combined filtrate evaporated at reduced pressure to an amber gum which was dissolved in 625 ml. of methanol purged with nitrogen and treated with 50 ml. of 25% sodium methoxide solution. After about 2 hours, 1400 ml. of saturated sodium chloride solution was added, and the mixture extracted with methylene chloride. The extract was dried and the solvent evaporated. The crude gummy product was purified via chromatography on a 2.5 kg. column of Florisil. A mixture composed of 6% of acetone and the remainder Skellysolve B eluted 13.34 g. of crystals, which on recrystallization from acetone-Skellysolve B yield 11.53 g. of the desired product melting at 158 to 159° C. A portion of this material was recrystallized from the same solvent pair to provide an analytical sample of pure 2α,7α,17α-trimethyl-17β-hydroxy-4-androsten-3-one (I) melting at 158 to 159° C.:

$$\lambda_{max.}^{alc.}\ 242\ m\mu$$

ε=15,500; γ$^{Nujol}$ 3435, 1665, 1622, 1200, 1166, 1075 cm.$^{-1}$ (index I–10,881). Depression of the melting point of the product (I) occurred on mixture with the starting material (I).

*Analysis.*—Calcd. for $C_{22}H_{34}O_2$: C, 79.95; H, 10.37. Found: C, 79.60; H, 10.48.

Following the procedure of (a) of Example 2, but substituting for the starting steriod 7α,17α-dimethyl-17β-hydroxy-4-androsten-3-one (I), the following representative starting materials:

(1) 7α,17α-dimethyl-19-nor-17β-hydroxy-4-androsten-3-one (I) and
(2) 7α,17α-dimethyl-19-nor-17β-hydroxy-4-androsten-3-one 17-acetate (I)

yields, respectively, (1) 2α,7α,17α-trimethyl-19-nor-17β-hydroxy - 4 - androsten-3-one (I) and
(2) 2α,7α17α-trimethyl-19-nor-17β-hydroxy - 4 - androsten-3-one 17-acetate (I).

(b) Following the procedure of Example 1, but substituting 2α,7α17α-trimethyl-17β - hydroxy - 4 - androsten-3-one (I) and its corresponding 19-nor derivative (prepared as in the preceding two paragraphs) as starting materials, yields 2α,7α,17α-trimethyl-17β-hydroxy-5β-androstan-3-one (II) and its 19-nor counterpart (II), respectively.

EXAMPLE 3

*7α,17α-dimethyl-17β-hydroxy-5α-androstan-3-one (II)*

To about 1.2 l. of liquid ammonia, 0.8 g. of lithium wire cut in small pieces was added. After the lithium had dissolved, 10 g. of 7α,17α,-dimethyl-17β-hydroxy-4-androsten-3-one (I) in 200 ml. of tetrahydrofuran (purified by passage through an aluminum oxide column) was added in a slow stream at reflux. The solution was refluxed for about 15 minutes, then 15 g. of solid ammonium chloride was added in small portions. The ammonia was rapidly evaporated on a steam bath. Water was added and the product extracted with ether. The ether extract was washed successively with water, dilute hydrochloric acid, water and brine, then dried over magnesium sulfate, filtered and concentrated to dryness. The amorphous solid was dissolved in methylene chloride and the solution poured onto a 250 g. Florisil column packed wet with Skellysolve B and eluted (employing 400 ml. fractions) by gradient elution between 5 l. of a mixture comprising 2% acetone and 98% Skellysolve B and 5 l. of a mixture of 12% acetone and 88% Skellysolve B to give 5.25 g. of material melting at 155 to 158° C. A second crop weighing 1.3 g. melting 150 to 153° C. was obtained from aqueous methanol. Recrystallization of 200 mg. of the first crop material from acetone-Skellysolve B provided material for analysis of the desired product, 7α,17α-dimethyl-17β-hydroxy-5α-androstan-3-one (II), melting at 155 to 157° C., with rotation [α]$_D$ −19° (chloroform); optical rotatory dispersion data confirmed the 5α-hydrogen configuration; its nuclear magnetic resonance spectrum supported the proposed structure.

*Analysis.*—Calcd. for $C_{21}H_{34}O_2$: C, 79.19; H, 10.76. Found: C, 79.38; H, 11.36.

Following the procedure of Example 3, but substituting 7α,17α-dimethyl - 19 - nor-17β-hydroxy-4-androsten-3-one (I) as starting material, yields 7α,17α-dimethyl - 19-nor-17β-hydroxy-5α-androstan-3-one (II).

EXAMPLE 4

*7α,17α-dimethyl-17β-hydroxy-5α-androstan-3-one 17-hydrocinnamate (II)*

A solution of 3 g. of 7α,17α-dimethyl-17β-hydroxy-5α-androstan-3-one (II) (from Example 3) in 15 ml. of acetic anhydride and 30 ml. of pyridine is heated at reflux for about 4 hours. After cooling the solution is washed successively with water, dilute acid, dilute base, water, dried over magnesium sulfate, and the solvent removed. The residue is chromatographed through Florisil and crystallized from acetone-Skellysolve B to give 7α,17α-dimethyl-17β-hydroxy-5α-androstan-3-one 17-acetate (II).

Following the procedure of Example 4, but substituting 7α-methyl-19-nor-17β-hydroxy - 5α - androstan-3-one (II) as starting material, yields 7α,17α-dimethyl-19-nor-17β-hydroxy-5α-androstan-3-one 17-acetate (II).

In the same manner as in Example 4, the 17β-hydrocinnamate, cyclopentylpropionate, formate, butyrate, isobutyrate, valerate, isovalerate, hexanoate, octanoate, phenylacetate, and other like 17-esters of 7α,17α-dimethyl-17β-hydroxy-5α-androstan-3-one (II) are prepared by reaction of their corresponding 17β-alcohols with the appropriate halide or acid anhydride.

EXAMPLE 5

*2α,7α,17α-trimethyl-17β-hydroxy-5α-androstan-3-one (II)*

To approximately 60 ml. of liquid ammonia cooled in a Dry Ice bath, 1 g. of lithium wire was added with stirring. When solution was complete, the cooling bath was removed and a solution of 2 g. of 2α,7α,17α-trimethyl-17β-hydroxy-4-androsten-3-one (I) in 30 ml. of tetrahydrofuran was added. After stirring for about 15 minutes, 5 g. of ammonium chloride was added, and the excess ammonia evaporated on a warm-water bath. The residue was partitioned between water and methylene chloride, the organic phase separated, washed with cold dilute hydrochloric acid, water, dried and the solvent evaporated. The residue was chromatographed on a 100 g. column of Florisil. The eluate was collected in 200 ml. fractions using a gradient from 2 to 7% acetone in Skellysolve B. Fractions 5 to 13 contained 1.89 g. of crystals which showed no 3-ketone band in infrared absorption spectrum; this material was therefore oxidized by treatment with 1.6 g. of sodium dichromate in 16 ml. of acetic acid at room temperature for 2 hours. The product was isolated by dilution with water and chromatographed as before on a 75 g. column of Florisil. Crystals were obtained from the eluate which showed the presence of a 3-keto substituent. After recrystallization from acetone-Skellysolve B, the product obtained, 2α,7α,17α-trimethyl-17β-hydroxy-5α-androstan-3-one (II), melted at 143–144° C. with absorption $$\gamma_{max}^{Nujol}\ 3520,\ 1695,\ 1166,\ 1075\ cm.^{-1}$$

*Analysis.*—Calcd. for $C_{22}H_{36}O_2$: C, 79.46; H, 10.91. Found: C, 76.16; H, 10.20.

Following the procedure of Example 5, but substituting 2α,7α17α-trimethyl-19-nor-17β-hydroxy-4-androsten-3-one (I) as starting material, yields 2α,7a,17α-trimethyl-19-nor-17β-hydroxy-5α-androstan-3-one (II).

EXAMPLE 6

*7α,17α-dimethyl-3β,17β-dihydroxy-5α-androstane (II)*

To a solution of 1.1 g. of 7α,17α-dimethyl-17β-hydroxy-5α-androstan-3-one (II) in 23 ml. of methanol and 1 ml. of water, 150 mg. of sodium borohydride was added while cooling and stirring. After 1.5 hours a few drops of acetic acid was added to destroy the excess borohydride. The reaction mixture was diluted to about 50 ml. with water, the precipitate collected, washed with water and dried. The crude material was recrystallized from aqueous methanol to give 0.67 g. of crude product (II) melting at 209 to 210° C. Another recrystallization gave an analytical sample of 7α,17α-dimethyl-3β,17β-dihydroxy-5α-androstane (II) melting at 214 to 215° C. and having a rotation [α]$_D$ of −39° (chloroform).

*Analysis.*—Calcd. for $C_{21}H_{36}O_2$: C, 78.69; H, 11.02, Found: C, 78.67; H, 10.92.

Following the procedure of Example 6, but substituting 2α,7α,17α-trimethyl - 17β - hydroxy-5α-androstan-3-one (II), 2α,7α,17α-trimethyl-19-nor - 17β - hydroxy - 5α-androstan-3-one (II), 7α,17α - dimethyl-19-nor-17β-hydroxy-5α-androstan-3-one (II) and the 17-acylates of the foregoing compounds (II) as starting materials, yields, respectively 2α,7α17α-trimethyl-3β,17β-dihydroxy - 5α-androstane (II), 2α,7α,17α - trimethyl-19-nor-3β,17β-dihydroxy-5α-androstane (II), 7α,17α-dimethyl-19-nor-3β,17β-dihydroxy-5α-androstane (II) and their corresponding 17-acylates (II).

EXAMPLE 7

*(a) 7α,17α-dimethyl-3α,17β-dihydroxy-5α-androstane 17-acetate (II) and 7α,17α-dimethyl-3β,17β-dihydroxy-5α-androstane 17-acetate (II)*

(a) To a suspension of 3.5 g. of lithium aluminum tri-t-butoxyhydride in 50 ml. of tetrahydrofuran, 3.5 g. of 7α,17α-dimethyl-17β-hydroxy-5α-androstan-3-one 17-acetate (II) is added with stirring at 0° C. The suspension is allowed to warm to room temperature during 30 minutes after which dilute hydrochloric acid is added dropwise until all of the excess hydride had been consumed. The solution is diluted further with 50 ml. of water and the tetrahydrofuran removed under reduced pressure. The product is extracted into ether and the combined extracts washed consecutively with water, saturated sodium chloride solution, dried with sodium sulfate and the solution evaporated to dryness under reduced pressure. Thin-layer chromatography on silica gel G (ethyl acetate cyclohexane 1:1) indicates the presence of both the 3α- and 3β-isomers of the product (II). This material adsorbed onto 175 g. of Florisil in methylene chloride and the column eluted by twenty-five 250 ml. fractions of acetone-Skellysolve B over a gradient of from 0 to 15% acetone. The middle fractions are combined and recrystallized from Skellysolve B to give the 3β-hydroxy product (II), 7α,17α-dimethyl-3β,17β-dihydroxy-5α-androstane 17-acetate.

Following the procedure of Example 7(a), but substituting for 7α,17α-dimethyl-17β-hydroxy-5α-androstan-3-one 17-acetate (II) the following representative starting materials:

(1) 7α,17α-dimethyl-19-nor-17β-hydroxy-5α - androstan-3-one 17-acetate (II),
(2) 2α,7α,17α-trimethyl-17β - hydroxy - 5α-androstan-3-one 17-acetate (II) and (3) 2α,7α,17α-trimethyl-19-nor-17β - hydroxy-5α-androstan-3-one 17-acetate (II), yields, respectively, (1) 7α,17α-dimethyl-19-nor-3α,17β - dihydroxy-5α-androstane 17-acetate (II) and 7α,17α-dimethyl-19-nor-3β,17β-dihydroxy-5α-androstane 17-acetate (II),
(2) 2α,7α,17α-trimethyl-3α,17β - dihydroxy - 5α - androstane 17-acetate (II) and 2α,7α,17α-trimethyl-3β,17β-dihydroxy-5α-androstane 17-acetate (II) and
(3) 2α,7α,17α-trimethyl-3α,17β-dihydroxy-5α-androstane 17-acetate (II) and 2α,7α,17α-trimethyl-3β,17β-dihydroxy-5α-androstane 17-acetate (II).

(b) *7α,17α-dimethyl-3α,17β-dihydroxy-5β-androstane 17-acetate (II) and 7α,17α-dimethyl-3β,17β-dihydroxy-5β-androstane 17-acetate (II)*

(b) To a solution of 1 g. of 7α,17α-dimethyl-17β-hydroxy-5β-androstan-3-one 17-acetate (II) [obtained by converting 7α,17α-dimethyl-17β-hydroxy-5β-androstan-3-one (II), prepared as in Example 1, to its corresponding 17-acetate (in the manner described in the last paragraph of Example 4)] in 25 ml. of methanol, a solution of 125 mg. of sodium borohydride in 2 ml. of water and 10 ml. of methanol is added. The mixture warms spontaneously and after standing at room temperature for about 20 minutes, excess borohydride is destroyed by addition of a few drops of acetic acid. The reaction mixture is diluted to about 50 ml. with water, extracted with ether, the ether extracts washed with water, dried over magnesium sulfate and evaporated to dryness under reduced pressure. The crude solid is recrystallized from acetone-Skellysolve B; recrystallization from the same solvent pair yields pure 7α,17α-dimethyl-3α,17β-dihydroxy-5β-androstane 17-acetate (II). Chromatography of the mother liquor over a Florisil column yields 7α-methyl-3β,17β-dihydroxy-5β-androstane 17-acetate (II).

Following the procedure of Example 7(*b*), but substituting for 7α,17α-dimethyl-17β-hydroxy-5β-androstan-3-one 17-acetate (II) the following representative starting materials:

(1) 7α,17α-dimethyl-19-nor-17β-hydroxy-5β - androstan-3-one 17-acetate (II),
(2) 2α,7α,17α-trimethyl-17β-hydroxy-5β - androstan - 3-one 17-acetate (II) and
(3) 2α,7α,17α-trimethyl-19 - nor - 17β-hydroxy-3-one 17-acetate (II), yields, respectively, (1) 7α,17α-dimethyl-19 - nor - 3α,17β-dihydroxy-5β-androstane 17-acetate (II) and 7α,17α-dimethyl-19-nor-3β,17β-dihydroxy-5β-androstane 17-acetate (II),
(2) 2α,7α,17α-trimethyl-3α,17β - dihydroxy - 5β-androstane 17-acetate (II) and 2α,7α,17α-trimethyl-3β,17β-dihydroxy-5β-androstane 17-acetate (II), and
(3) 2α,7α,17α-trimethyl-19 - nor - 3α,17β-dihydroxy-5β-androstane 17-acetate (II) and 2α,7α,17α-trimethyl-19-nor-3β,17β-dihydroxy-5β-androstane 17-acetate (II).

(c) *7α,17α-dimethyl-3α,17β-dihydroxy-5α-androstane (II)*

100 mg. of 7α,17α-dimethyl-3α,17β-dihydroxy-5α-androstane 17-acetate (II), obtained according to the procedure of Example 7(*a*), is dissolved in 4 ml. of 5% potassium hydroxide in methanol, followed by the addition of 4 drops of water. After standing for about 15 hours at room temperature the solution is warmed on a steam bath and diluted to incipient crystallization by the dropwise addition of water. On cooling, a colorless crystalline product (II) is isolated by filtration and air dried. Recrystallization of this material from alcohol and water gives pure 7α,17α - dimethyl-3α,17β-dihydroxy-5α-androstane (II). Alternatively, the product may be purified by chromatography and crystallization.

Following the procedure of Example 7(*c*), but substituting for 7α,17α-dimethyl-3α,17β-dihydroxy-5α-androstane 17-acetate (II) the following representative starting materials:

(1) 7α,17α-dimethyl-19 - nor - 3β,17β-dihydroxy-5-α-androstane 17-acetate (II),
(2) 7α,17α-dimethyl-3α,17β-dihydroxy - 5β - androstane 17-acetate (II),
(3) 2α,7α,17α-trimethyl-3α,17β - dihydroxy - 5α-androstane 17-acetate (II) and
(4) 2α,7α,17α-trimethyl-19 - nor - 3β,17β-dihydroxy-5β-androstane 17-acetate (II), yields, respectively, (1) 7α,17α-dimethyl-19 - nor - 3β,17β-dihydroxy-5α-androstane (II),
(2) 7α,17α-dimethyl-3α,17β-dihydroxy - 5β - androstane (II),
(3) 2α,7α,17α-trimethyl - 3α,17β - dihydroxy-5α-androstane (II) and
(4) 2α,7α,17α-trimethyl-19 - nor - 3β,17β-dihydroxy-5β-androstane (II).

EXAMPLE 8

*7α,17α-dimethyl-17β-hydroxy-5α-androstan-3-one 3-thioketal*

To a solution of 2 g. of 7α,17α-dimethyl-17β-hydroxy-5α-androstan-3-one (II), (prepared as in Example 3) in 6 ml. of acetic acid cooled to about 10° C., 0.7 ml. of ethanedithiol and 0.7 ml. of boron trifluoride etherate is added. After standing at room temperature for about 20 minutes the reaction mixture is diluted to a volume of about 25 ml. with water and ice. The crystals are collected, washed with water and dried to yield the crude product, which on recrystallization from a mixture of methanol and methylene chloride gives pure 7α-methyl-17β-hydroxy-5α-androstan-3-one-3-thioketal.

Following the procedure of Example 8 but substituting the following representative compounds for the starting material employed therein:

(1) 7α,17α-dimethyl-19-nor-17β-hydroxy-5α-androstan-3-one (II),
(2) 2α,7α,17α-trimethyl-17β-hydroxy-5α-androstan - 3-(II) (obtained in Example 5),
(3) 2α,7α,17α-trimethyl-19-nor-17β-hydroxy-5α-androstan-3-one (II) (obtained in the paragraph following Example 5),
(4) 7α,17α-dimethyl-17β-hydroxy-5β-androstan-3 - one (II),
(5) 2α,7α,17α-trimethyl-17β-hydroxy-5β-androstan - 3-one (II),
(6) 7α,17α-dimethyl-19-nor-17β-hydroxy-5β-androstan-3-one (II) and
(7) 2α,7α,17α-trimethyl-19-nor-17β-hydroxy-5β-androstan-3 one (II), yields, respectively,
(1) 7α,17α-dimethyl-19-nor-17β-hydroxy-5α-androstan-3-one 3-thioketal,
(2) 2α,7α,17α-trimethyl-17β-hydroxy-5α-androstan - 3-one 3-thioketal,
(3) 2α,7α,17α-trimethyl-19-nor-17β-hydroxy-5α-androstan-3-one 3-thioketal,
(4) 7α,17α-dimethyl-17β-hydroxy-5β-androstan - 3-one 3-thioketal,
(5) 2α,7α,17α-trimethyl-17β-hydroxy-5β-androstan - 3-one 3-thioketal,
(6) 7α,17α-dimethyl-17-hydroxy-5β-androstan - 3 - one 3-thioketal, and
(7) 2α,7α,17α-trimethyl-19-nor-17β-hydroxy-5β-androstan-3-one (II), yields, respectively, In the examples relating to 3-thioketals, the specific ketal used is the cyclic 3-(ethylene mercaptole), also named as a cyclic 3-(ethylene dithioketal). For brevity, these are referred to as the 3-thioketal.

EXAMPLE 9

*7α,17α-dimethyl-17β-hydroxy-5α-androstane (II)*

To a solution of 1 g. of 7α,17α-dimethyl-17β-hydroxy-5α-androstan-3-one 3-thioketal (obtained in Example 8), 30 ml. of distilled liquid ammonia, 15 ml. of ether and 5 ml. of tetrahydrofuran, 1 g. of sodium metal is added in small pieces. The solution is refluxed for about 15 minutes and the blue color discharged by dropwise addition of absolute ethanol. A rapid stream of nitrogen is passed through the reaction vessel to evaporate the solvents. After removal of most of the ammonia and other solvents, water is added. The resulting precipitate is collected, washed with water, dried and recrystallized from Skellysolve B or chromatographed through a Florisil column to yield 7α,17α-dimethyl-17β-hydroxy-5α-androstane (II).

Following the procedure of Example 9 but substituting the following representative compounds for the starting material employed therein:

(1) 7α,17α-dimethyl-19-nor-17β-hydroxy-5α-androstan-3-one 3-thioketal,
(2) 2α,7α,17α-trimethyl-17β-hydroxy-5α-androstan-3-one 3-thioketal,
(3) 2α,7α,17α-trimethyl-19-nor-17β-hydroxy-5α-androstan-3-one 3-thioketal,
(4) 7α,17α-dimethyl-17β-hydroxy-5β-androstan-3-one 3-thioketal,
(5) 2α,7α,17α-trimethyl-17β-hydroxy-5β-androstan-3-one 3-thioketal,
(6) 7α,17α-dimethyl-17β-hydroxy-5β-androstan-3-one 3-thioketal, and
(7) 2α,7α,17α-trimethyl-19-nor-17β-hydroxy-5β-androstan-3-one 3-thioketal, yields, respectively, (1) 7α,17α-dimethyl-19-nor-17β-hydroxy-5α-androstane (II),
(2) 2α,7α,17α-trimethyl-17β-hydroxy-5α-androstane (II),
(3) 2α,7α,17α-trimethyl-17β-hydroxy-5α-androstane (II),
(4) 7α,17α-dimethyl-17β-hydroxy-5β-androstane (II),
(5) 2α,7α,17α-trimethyl-17β-hydroxy-5β-androstane (II),
(6) 7α,17α-dimethyl-19-nor-17β-hydroxy-5β-androstane (II), and
(7) 2α,7α,17α-trimethyl-19-nor-17β-hydroxy-5β-androstane (II).

EXAMPLE 10

*7α,17α-dimethyl-19-nor-17β-hydroxy-4-androsten-3-one 3-thioketal (7α,17α-dimethyl-19-nortestosterone 3-thioketal)*

To a solution of 2 g. of 7α,17α-dimethyl-19-nor-17β-hydroxy-4-androsten-3-one (I) in 6 ml. of acetic acid cooled to about 10° C., 0.7 ml. of ethanedithiol and 0.7 ml. of boron trifluoride etherate is added. After standing at room temperature for about 20 minutes the reaction mixture is diluted to a volume of about 25 ml. with water and ice. The crystals are collected, washed with water and dried to yield the product, which is recrystallized from a mixture of methanol and methylene chloride or other inert solvent to give 2.3 g. of 7α,17α-dimethyl-19-nor-17β-hydroxy-4-androsten-3-one 3-thioketal.

Following the procedure of Example 10 but substituting the following compounds for the starting material employed therein:

(1) 7α,17α-dimethyl-17β-hydroxy-4-androsten-3-one (I),
(2) 2α,7α,17α-trimethyl-17β-hydroxy-4-androsten-3-one (I) and
(3) 2α,7α,17α-trimethyl-19-nor-17β-hydroxy-4-androsten-3-one (I), yields, respectively, (1) 7α,17α-dimethyl-17β-hydroxy-4-androsten-3-one 3-thioketal,
(2) 2α,7α,17α-trimethyl-17β-hydroxy-4-androsten-3-one 3-thioketal, and
(3) 2α,7α,17α-trimethyl-19-nor-17β-hydroxy-4-androsten-3-one 3-thioketal.

EXAMPLE 11

*7α,17α-dimethyl-19-nor-17β-hydroxy-4-androstene (7α,17α,-dimethylestr-4-en-17β-ol) (II)*

To a solution of 1 g. of 7α,17α-dimethyl-19-nor-17β-hydroxy-4-androsten-3-one 3-thioketal, 30 ml. of distilled liquid ammonia, 15 ml. of ether and 5 ml. of tetrahydrofuran, 1 g. of sodium metal is added in small pieces. The steroid goes into solution rapidly as the sodium dissolves. The solution is refluxed for about 15 minutes and the blue color is discharged by dropwise addition of absolute ethanol. A fast stream of nitrogen is passed through to aid in evaporating the solvents. After nearly all of the ammonia and other solvents are removed, water is added. The resulting precipitate is collected, washed with water, dried and recrystallization from Skellysolve B or chromatographed through a Florisil column to yield 7α,17α-dimethyl-19-nor-17β-hydroxy-4-androstene (II).

Following the procedure of Example 11 but substituting the following compounds for the starting material employed therein:

(1) 7α,17α-dimethyl-17β-hydroxy-4-androsten-3-one 3-thioketal,
(2) 2α,7α,17α-trimethyl-17β-hydroxy-4-androsten-3-one 3-thioketal and
(3) 2α,7α,17α-trimethyl-19-nor-17β-hydroxy-4-androsten-3-one 3-thioketal, yields, respectively, (1) 7α,17α-dimethyl-17β-hydroxy-4-androstene,
(2) 2α,7α,17α-trimethyl-17β-hydroxy-4-androstene and
(3) 2α,7α,17α-trimethyl-19-nor-17β-hydroxy-4-androstene.

EXAMPLE 12

*7α,17α-dimethyl-19-nor-17β-hydroxy-5β-androstane (II)*

A suspension containing 1 g. of 7α,17α-dimethyl-19-nor-17β-hydroxy-4-androstene (obtained in Example 11) and 0.2 g. of 5% palladium-on-charcoal in 200 ml. of 95% alcohol is reacted with hydrogen until 1 mole equivalent of hydrogen is consumed. The catalyst is filtered off and the filtrate concentrated to dryness. The residue is purified by chromatography employing a column of Florisil to give 7α,17α-dimethyl-19-nor-17β-hydroxy-5β-androstane (II).

Following the procedure of Example 12, but substituting Adams (platinum dioxide) catalyst for 5% palladium-on-charcoal also yields 7α,17α-dimethyl-19-nor-17β-hydroxy-5β-androstane (II).

Following the procedure of Example 12 but substituting the following representative compounds for the starting material employed therein:

(1) 7α,17α-dimethyl-17β-hydroxy-4-androstene,
(2) 2α,7α,17α-trimethyl-17β-hydroxy-4-androstene and
(3) 2α,7α,17α-trimethyl-19-nor-17β-hydroxy-4-androstene, yields, respectively, (1) 7α,17α-dimethyl-17β-hydroxy-5β-androstane (II),
(2) 2α,7α,17α-trimethyl-17β-hydroxy-5β-androstane (II) and
(3) 2α,7α,17α-trimethyl-19-nor-17β-hydroxy-5β-androstane (II).

EXAMPLE 13

*7α,17α-dimethyl-3α,17β-dihydroxy-5β-androstane (II)*

To a solution of 1 g. of 7α,17α-dimethyl-17β-hydroxy-5β-androstan-3-one (II) (prepared as in Example 1) in 100 ml. of tetrahydrofuran, 1.5 g. of lithium aluminum tri-t-butoxyhydride is added at about 0° C. with stirring.

The reaction mixture is stored at about −15° C. for about 18 hours. Dilute acetic acid is added until the inorganic materials coagulate. The organic phase is decanted, dried over magnesium sulfate, filtered, concentrated to dryness, dissolved in an organic solvent and purified by chromatography with a Florisil column to yield pure 7α,17α-dimethyl-3α,17β-dihydroxy-5β-androstane (II).

Following the procedure of Example 13, but substituting the following representative starting materials:

(1) 7α,17α-dimethyl-19-nor-17β-hydroxy-5β-androstan-3-one (II),
(2) 2α,7α,17α-trimethyl-17β-hydroxy-5β-androstan-3-one (II) and
(3) 2α,7α,17α-trimethyl-19-nor-17β-hydroxy-5β-androstan-3-one (II), yields, respectively, (1) 7α,17α-dimethyl-19-nor-3α,17β-dihydroxy-5β-androstane (II),
(2) 2α,7α,17α-trimethyl-3α,17β-dihydroxy-5β-androstane (II) and
(3) 2α,7α,17α-trimethyl-19-nor-3α,17β-dihydroxy-5β-androstane (II).

EXAMPLE 14

*4,7α,17α-trimethyl-17β-hydroxy-4-androsten-3-one 17-acetate (4,7α,17α-trimethyltestosterone 17-acetate) (II)*

To a flask containing a mixture of 4.4 ml. of thiophenol, 2.6 ml. of 38% aqueous formaldehyde, 2.6 ml. of trimethylamine and 9 ml. of ethanol, 5 g. of 7α,17α-dimethyl - 17β - hydroxy - 4 - androsten - 3 - one (7α,17α-dimenthyltestosterone) (I) is added and the mixture is refluxed for 6 days. The reaction mixture is cooled, poured into 200 ml. of aqueous potassium hydroxide and the steroid extracted with methylene chloride. The extract is washed with water, dried over anhydrous sodium sulfate and concentrated to dryness by vacuum distillation over a steam bath. This material, (7α,17α-dimethyl-17β-hydroxy-4-androsten-3-one 4-methylthiophenol) (I′), is dissolved in 50 ml. of pyridine and acetylated with 20 ml. of acetic anhydride by warming to about 80° C. for about 16 hours. The mixture is poured into ice water and allowed to stand for about 40 minutes to hydrolyze the excess acetic anhydride. The product (the 17-acetate of 7α,17α-dimethyl-17β - hydroxy - 4 - androsten - 3 - one 4 - methylthiophenol) (I″) is extracted with methylene chloride, the extract washed successively with cold dilute hydrocloric acid to remove the pyridine, with aqueous sodium bicarbonate, finally water and dried over anhydrous sodium sulfate. The dried extract is concentrated and then dissolved in about 60 ml. of acetone. Approximately 50 ml. of Raney nickel sludge is washed by decantation three times with 200 ml. portions of acetone. The sludge is then suspended in 200 ml. of acetone and refluxed with efficient stirring for about 60 minutes in a nitrogen atmosphere. The 17-acetate of the 4-methylthiophenol steroid (I″) in acetone solution is added to the acetone suspension of Raney nickel and the mixture stirred and refluxed for about 4 hours. The Raney nickel is filtered from the acetone solution through a half-inch bed of Celite (diatomaceous earth). The flask is rinsed and the residue washed with 100 ml. of hot ethyl alcohol. The residue is finally washed with 50 ml. of deionized water and discarded. The filtrate is concentrated to dryness by vacuum distillation. The total crude product (II) is dissolved in 75 ml. of methylene chloride and chromatographed over a 280 g. column of Florisil. The column is developed with 100 ml. portions of acetone in Skellysolve B. The major portion of the eluate is crystallized from Skellysolve B to give the desired product, 4,7α,17α-trimethyl-17β-hydroxy-4-androsten-3-one 17-acetate (II).

Following the procedure of Example 14, but substituting the other compounds embraced by Formula I of the flow-sheet on page 2, above, as starting materials, yields the corresponding compounds of Formula II thereof. Thus, replacing 7α,17α-dimethyl-17β-hydroxy-4-androsten-3-one (I) by:

(1) 7α,17α-dimethyl-19-nor-17β-hydroxy-4-androsten-3-one,
(2) 2α,7α,17α-trimethyl-17β-hydroxy-4-androsten-3-one (I),
(3) 2α,7α,17α-triemthyl-19-nor-17β-hydroxy-4-androsten-3-one (I),
(4) 7α,17α-dimethyl-3α,17β-dihydroxy-4-androstene (I),
(5) 7α,17α-dimehyl-19-nor-3β-17β-dihydroxy-4-androstene (I),
(6) 2α,7α,17α-trimethyl-3α,17β-dihydroxy-4-androstene (I) and
(7) 2α,7α,17α-trimethyl-19-nor-3β,17β-dihydroxy-4-androstene (I), yields, respectively, (1) 4,7α,17α-trimethyl-17β-hydroxy-19-nor-17β-hydroxy-4-androsten-3-one 17-acetate (II),
(2) 2α,4,7α,17α-tetramethyl-17β-hydroxy-4-androsten-3-one 17-acetate (II),
(3) 2α,4,7α,17α-tetramethyl-19-nor-17β-hydroxy-4-androsten-3-one 17-acetate (II),
(4) 4,7α,17α-tetramethyl-3α,17β-dihydroxy-4-androstene 3,17-diacetate (II),
(5) 4,7α,17α-trimethyl-19-nor-3β,17β-dihydroxy-4-androstene 3,17-diacetate (II),
(6) 2α,4,7α,17α-tetramethyl-3α,17β-dihydroxy-4-androstene 3,17-diacetate (II) and
(7) 2α4,7α,17α-tetramethyl-19-nor-3β,17β-dihydroxy-4-androstene 3,17-diacetate (II).

Following the procedure of Example 7(c) but substituting the products prepared in Example 14 and those of the immediately preceding paragraph, converts the 17-acetates and 3,17-diacetates therein to the corresponding 3-hydroxy and 3,17-dihydroxy compounds.

EXAMPLE 15

*4,7α,17α-trimethyl-17β-hydroxy-4-androsten-3-one (4,7α,17α-trimethyltestosterone) (II)*

To 600 mg. of 4,7α,17α-trimethyl-17β-hydroxy-4-androsten-3-one 17-acetate (II) dissolved in 50 ml. of 95% ethanol, 100 mg. of potassium hydroxide is added. The mixture is swirled until the base dissolves and is allowed to stand at room temperature for about 20 hours. The mixture is then made barely acidic with dilute acetic and the major portion of the ethanol removed by vacuum distillation. The product separates from the mixture and is collected by filtration, washed with deionized water and dried under vacuum at 40° C. or is extracted with methylene chloride, washed with water until neutral, dried over sodium sulfate. The solvent is removed and the residue chromatographed and recrystallized to give 4,7α,-17α-trimethyl-17β-hydroxy-4-androsten-3-one (II).

Following the procedure of Example 15, but substituting for 4,7α,17α-trimethyl-17β-hydroxy-4-androsten-3-one 17-acetate (II), the following representative starting materials:

(1) 4,7α,17α-trimethyl-17β-hydroxy-4-androsten-3-one 17-acetate (II),
(2) 4,7α,17α-trimethyl-17β-hydroxy-19-nor-17β-hydroxy-4-androsten-3-one 17-acetate (II),
(3) 2α,4,7α,17α-tetramethyl-17β-hydroxy-4-androsten-3-one 17-acetate (II),
(4) 2α,4,7α,17α-tetramethyl-19-nor-17β-hydroxy-4-androsten-3-one 17-acetate (II),
(5) 4,7α,17α-trimethyl-3β,17β-dihydroxy-4-androstene 3,17-diacetate (II),
(6) 4,7α,17α-trimethyl-19-nor-3α,17β-dihydroxy-4-androstene 3,17-diacetate (II),
(7) 2α,4,7α,17α-tetramethyl-3β,17β-dihydroxy-4-androstene 3,17-diacetate (II) and (8) 2α,4,7α,17α-tetramethyl-19-nor-3β,17β-dihydroxy-4-androstene 3,17-diacetate (II), yields, respectively, (1) 4,7α,17α-trimethyl-17β-hydroxy-4-androsten-3-one (II),
(2) 4,7α,17α-trimethyl-17β-hydroxy-19-nor-17β-hydroxy-4-androsten-3-one (II),
(3) 2α,4,7α,17α-tetramethyl-17β-hydroxy-4-androsten-3-one (II),
(4) 2α,4,7α,17α-tetramethyl-19-nor-17β-hydroxy-4-androsten-3-one (II),
(5) 4,7α,17α-trimethyl-3β,17β-dihydroxy-4-androstene (II),
(6) 4,7α,17α-trimethyl-19-nor-3α,17β-dihydroxy-4-androstene (II),
(7) 2α,4,7α,17α-tetramethyl-3β,17β-dihydroxy-4-androstene (II), and
(8) 2α,4,7α,17α-tetramethyl-19-nor-3β,17β-dihydroxy-4-androstene (II).

EXAMPLE 16

*4α,7α,17α-trimethyl-17β-hydroxy-5β-androstan-3-one (II)*

A solution of 1 g. of 4,7α,17α-trimethyl-17β-hydroxy-4-androsten-3-one (4,7α,17α-trimethyltestosterone) (II) (prepared as in Example 15) in 250 ml. of 95% ethyl alcohol is reacted with hydrogen using 5% palladium on charcoal catalyst until 1 mole equivalent of hydrogen is absorbed. The catalyst is removed by filtration through a bed of Celite (diatomaceous earth). The filtrate is concentrated to dryness, chromatographed and recrystallized from a mixture of acetone and Skellysolve B to give 4α,7α,17α-trimethyl-17β-hydroxy-5β-androstan-3-one (II).

Following the procedure of Example 16 but substituting for 4,7α,17α-trimethyl-17β-hydroxy-4-androsten-3-one (II), the following representative starting materials:

(1) 4,7α,17α-trimethyl-19-nor-17β-hydroxy-4-androsten-3-one (II) and
(2) 4,7α,17α-trimethyl-19-nor-17β-hydroxy-4-androsten-3-one 17-acetate (II), yields, respectively, (1) 4α,7α,17α-trimethyl-19-nor-17β-hydroxy-5β-androstan-3-one (II) and
(2) 4α,7α,17α-trimethyl-19-nor-17β-hydroxy-5β-androstan-3-one 17-acetate (II).

EXAMPLE 17

*2α,4,7α,17α-tetramethyl-17β-hydroxy-4-androsten-3-one (II)*

(a) To a solution of 50 g. of 4,7α,17α-trimethyl-17β-hydroxy-4-androsten-3-one (4,7α,17α-trimethyltestosterone) (II) (prepared as in Example 15) in 750 ml. of t-butyl alcohol, warmed to 55° C. in a nitrogen atmosphere, 50 ml. of ethyl oxalate and 65 ml. of 25% sodium methoxide solution is added with stirring. Stirring is continued for about 20 minutes after which 750 ml. of ether is added. The mixture is filtered and the solid of crude yellow glyoxalate dried in a vacuum oven. A mixture of the crude glyoxalate, potassium carbonate, methyl iodide and acetone is stirred and heated under reflux for about 24 hours. Approximately, a third of the liquid is distilled off and the remaining mixture filtered. The filter cake is washed with acetone and the combined mixture filtered. The cake is washed with additional acetone and the combined filtrate evaporated at reduced pressure to an amber gum which is dissolved in methanol purged with nitrogen and treated with 25% sodium methoxide solution. After about 2 hours, saturated sodium chloride solution is added, and the mixture extracted with methylene chloride. The extract is dried and the solvent evaporated. The crude gummy product is purified via chromatography on a column of Florisil. A mixture composed of a minor proportion of acetone and the remainder Skellysolve B eluted light colored crystals, which on recrystallization from acetone-Skellysolve B yields the desired product, pure 2α,4,7α,17α-tetramethyl-17β-hydroxy-4-androsten-3-one (II).

Following the procedure of (a) of Example 17, but substituting for the starting steroid 4,7α,17α-trimethyl-17β-hydroxy-4-androsten-3-one (II), the following representative starting materials:

(1) 4,7α,17α-trimethyl-19-nor-17β-hydroxy-4-androsten-3-one (II) and
(2) 4,7α,17α-trimethyl-19-nor-17β-hydroxy-4-androsten-3-one 17-acetate (II), yields, respectively, (1) 2α,4,7α,17α-tetramethyl-19-nor-17β-hydroxy-4-androsten-3-one (II) and
(2) 2α,4,7α,17α-tetramethyl-19-nor-17β-hydroxy-4-androsten-3-one 17-acetate (II).

(b) Following the procedure of Example 16, but substituting 2α,4,7α,17α-tetramethyl-17β-hydroxy-4-androsten-4-one (II) and its corresponding 19-nor derivative (prepared as in the preceding two paragraphs) as starting materials, yields 2α,4α,7α,17α-tetramethyl-17β-hydroxy-4-androsten-3-one (II) and its 19-nor counterpart (II), respectively.

EXAMPLE 18

*4α,7α,17α-trimethyl-17β-hydroxy-5α-androstan-3-one (II)*

To about 1.2 l. of liquid ammonia, 0.8 g. of lithium wire cut in small pieces is added. After the lithium dissolves, 10 g. of 4,7α,17α-trimethyl-17β-hydroxy-4-androsten-3-one (II) in 200 ml. of tetrahydrofuran (purified by passage through an aluminum oxide column) is added in a slow stream at reflux. The solution is refluxed for about 15 minutes, then 15 g. of solid ammonium chloride is added in small portions. The ammonia produced is rapidly evaporated on a steam bath. Water is added and the product extracted with ether. The ether extract is washed successively with water, dilute hydrochloric acid, water and brine, then dried over magnesium sulfate, filtered and concentrated to dryness. The amorphous solid is dissolved in methylene chloride and the solution poured onto a 250 g. Florisil column packed wet with Skellysolve V and eluted (employing 400 ml. fractions) by gradient elution between 5 l. of a mixture comprising 2% acetone and 98% Skellysolve B and 5 l. of a mixture of 12% acetone and 88% Skellysolve B to give the desired material. Recrystallization of material from acetone-Skellysolve B provided the desired pure product, 4α,7α,17α-trimethyl-17β-hydroxy-5α-androstan-3-one (II).

Following the procedure of Example 18, but substituting 4,7α,17α-trimethyl-19-nor-17β-hydroxy-4-androsten-3-one (II) as starting material yields 4α,7α,17α-trimethyl-19-nor-17β-hydroxy-5α-androstan-3-one (II).

EXAMPLE 19

*2α,4α,7α,17α,tetramethyl-17β-hydroxy-5α-androstan-3-one (II)*

To approximately 60 ml. of liquid ammonia cooled in a Dry-Ice bath, 1 g. of lithium wire is added with stirring. When solution is complete, the cooling bath is removed and a solution of 2 g. of 2α,4α,7α,17α-tetramethyl-17β-hydroxy-4-androsten-3-one (II) in 30 ml. of tetrahydrofuran is added. After stirring for about 15 minutes, 5 g. of ammonium chloride is added, and the excess ammonia evaporated on a warm-water bath. The residue is partitioned between water and methylene chloride, the organic phase is separated, washed with cold dilute hydrochloric acid, water, dried and the solvent evaporated. The residue is chromatographed on a 100 g. column of Florisil. The eluate is collected in 200 ml. fractions using a gradient from 2 to 7% acetone in Skellysolve B. Some fractions contained residues which showed no 3-ketone band in infrared absorption spectrum; this material is oxidized by treatment with sodium dichromate in acetic acid at room temperature for 2 hours. The product is isolated by dilution with water combined with the fractions showing ketone absorption in the infrared and chromatographed as before on a 75 g. column of Florisil. The eluate shows the presence of a 3-keto substituent. After recrystallization from acetone-Skellysolve B, the product, 2α,4α,7α,17α-tetramethyl - 17β - hydroxy-5α-androstan-3-one (II), is obtained.

Following the procedure of Example 19, but substituting 4α,7α,17α-trimethyl-19-nor-17β-hydroxy-4-androsten-3-one (II) as starting material, yields 4α,7α,17α-trimethyl-19-nor-17β-hydroxy-5α-androstane (II).

EXAMPLE 20

*4α,7α,17α-trimethyl-3β,17β-dihydroxy-5α-androstane(II)*

To a solution of 1.1 g. of 4α,7α,17α-trimethyl-17β-hydroxy-5α-androstan-3-one (II) in 23 ml. of methanol and 1 ml. of water, 150 mg. of sodium borohydride is added while cooling and stirring. After 1.5 hours a few drops of acetic acid is added to destroy the excess borohydride. The reaction mixture is diluted to about 50 ml. with water, the precipitate collected, washed with water and dried. The crude material is recrystallized from aqueous methanol to give 4α,7α,17α-trimethyl-3β,17β-dihydroxy-5α-androstane (II).

Following the procedure of Example 20, but substituting 2α,4α,7α,17α-tetramethyl - 17β - hydroxy-5α-androstan-3-one (II), 2α,4α,7α,17α-tetramethyl-19-nor-17β-hydroxy-5α-androstan (II), 4α,7α,17α-trimethyl-19-nor-17β-hydroxy-5α-androstan-3-one (II), and the 17-acylates of the foregoing compounds (II) as starting materials, yields, respectively, 2α,4α,7α,17α-tetramethyl-3β,17β-dihydroxy-5α-androstane (II), 2α,4α,7α,17α-tetramethyl-19-nor-3β,17β-dihydroxy-5α-androstane (II), 4α,7α,17α - trimethyl-19-nor-3β,17β-dihydroxy - 5α - androstane (II) and their corresponding 17-acylates (II).

EXAMPLE 21

(a) *4α,7α,17α-trimethyl-3α,17β-dihydroxy-5α-androstane 17-acetate (II) and 4α,7α,17α-trimethyl-3β,17β-dihydroxy-5α-androstane 17-acetate (II)*

(a) To a suspension of 1.5 g. of sodium borohydride in 50 ml. of tetrahydrofuran, 3.5 g. of 4α,7α,17α-trimethyl-17β-hydroxy-5α-androstan-3-one 17-acetate (II) is added with stirring at 0° C. The suspension is allowed to warm to room temperature during 30 minutes after which dilute hydrochloric acid is added dropwise until all of the excess hydride is consumed. The solution is diluted further with 50 ml. of water and the tetrahydrofuran removed under reduced pressure. The product is extracted into ether and the combined extracts washed consecutively with water, saturated sodium chloride solution, dried with sodium sulfate, and the solution evaporated to dryness under reduced pressure. Thin-layer chromatography on silica gel G (ethyl acetate-cyclohexane 1:1) indicates the presence of both the 3α- and 3β-isomers of the product (II'). This material is adsorbed onto 175 g. of Florisil in methylene chloride and the column eluated with acetone-Skellysolve B over a gradient of from 0 to 15% acetone. The fractions containing the minor isomer are combined and recrystallized from acetone-Skellysolve B to give 4α,7α,17α-trimethyl-3α,17β-dihydroxy-5α-androstane 17-acetate (II).

Following the procedure of Example 21(a), but substituting for 4α,7α,17α-trimethyl-17β-hydroxy-5α-androstan-3-one 17-acetate (II) the following representative starting materials:

(1) 4α,7α,17α-trimethyl-17β-hydroxy-5α-androstan-3-one 17-acetate (II'),
(2) 2α,4α,7α17α-tetramethyl-17β-hydroxy-5α-androstan-3-one 17-acetate (II') and
(3) 2α,4α,7α,17α-tetramethyl-19-nor-17β-hydroxy-5α-androstan-3-one 17-acetate (II), yields, respectively, (1) 4α,7α,17α-trimethyl-19-nor-3α,17β-dihydroxy-5α-androstane 17-acetate (II) and 4α,7α,17α-trimethyl-19-nor-3β,17β-dihydroxy-5α-androstane 17-acetate (II),
(2) 2α,4α,7α,17α-tetramethyl-3α,17β-dihydroxy-5α-androsane 17-acetate (II) and 2α,4α,7α,17α-tetramethyl-3β,17β-dihydroxy-5α-androstane 17-acetate (II) and
(3) 2α,4α,7α,17α-tetramethyl-3α,17β-dihydroxy-5α-androstane 17-acetate (II) and 2α,4α,7α,17α-tetramethyl-3β,17β-dihydroxy-5α-androstane 17-acetate (II).

(b) *4α,7α,17α-trimethyl-3α,17β-dihydroxy-5β-androstane 17-acetate (II) and 4α,7α,17α-trimethyl-3β,17β-dihydroxy-5β-androstane 17-acetate (II)*

(b) To a solution of 1 g. of 4α,7α,17α-trimethyl-17β-hydroxy-5β-androstan-3-one 17-acetate (II') [obtained by converting 4α,7α,17α-trimethyl - 17β - hydroxy-5β-androstan-3-one (II'), prepared as in Example 16, to its corresponding 17-acetate (in the manner described in the last paragraph of Example 4)] in 25 ml. of methanol, a solution of 125 mg. of sodium borohydride in 2 ml. of water and 10 ml. of methanol is added. The mixture warms spontaneously and after standing at room temperature for about 20 minutes, excess borohydride is destroyed by addition of a few drops of acetic acid. The reaction mixture is diluted to about 50 ml. with water, extracted with ether, the ether extracts washed with water, dried over magnesium sulfate and evaporated to dryness under reduced pressure. The crude solid is recrystallized from acetone-Skellysolve B; recrystallization from the same solvent pair yields pure 4α,7α,17α-trimethyl-3α,17β-dihydroxy-5β-androstane 17-acetate (II). Chromatography of the mother liquor over a Florisil column yields 4α,7α,17α-trimethyl - 3β,17β - dihydroxy - 5β - androstane 17-acetate (II).

Following the procedure of Example 21(b), but substituting for 4α,7α,17α-trimethyl-17β-hydroxy-5β-androstan-3-one 17-acetate (II) the following representative starting materials:

(1) 4α,7α,17α-trimethyl-19-nor-17β-hydroxy-5β-androstan-3-one 17-acetate (II),
(2) 2α,4α,7α,17α-tetramethyl-17β-hydroxy-5β-androstan-3-one 17-acetate (II) and
(3) 2α,4α,7α,17α-tetramethyl-19-nor-17β-hydroxy-3-one 17-acetate (II), yields, respectively, (1) 4α,7α,17α-trimethyl-19-nor-3α,17β-dihydroxy-5β-androstane 17-acetate (II) and 4α,7α,17α-trimethyl-19-nor-3β,17β-dihydroxy-5β-androstane 17-acetate (II),
(2) 2α,4α,7α,17α-tetramethyl-3α,17β-dihydroxy-5β-androstane 17-acetate (II) and 2α,4α,7α,17α-tetramethyl-3β,17β-dihydroxy-5β-androstane 17-acetate (II), and
(3) 2α,4α,7α,17α-tetramethyl-19-nor-3α,17β-dihydroxy-5β-androstane 17-acetate (II) and 2α,4α,7α,17α-tetramethyl-19-nor-3β,17β-dihydroxy-5β-androstane 17-acetate (II).

(c) *4α,7α,17α-trimethyl-3α,17β-dihydroxy-5α-androstane (II)*

(c) 100 mg. of 4α,7α,17α-trimethyl-3α,17β-dihydroxy-5α-androstane 17-acetate (II), obtained according to the procedure of Example 21(a), is dissolved in 4 ml. of 5% potassium hydroxide in methanol, followed by the addition of 4 drops of water. After standing for about 15 hours at room temperature the solution is warmed on a steam bath and diluted to incipient crystallization by the dropwise addition of water. On cooling, a colorless crystalline product (II) is isolated by filtration and air dried. Recrystallization of this material from alcohol and water gives pure 4α,7α,17α-trimethyl-3α,17β-dihydroxy-5α-androstane (II).

Following the procedure of Example 21(c), but substituting for 4α,7α,17α-trimethyl-3α,17β-dihydroxy-5α-androstane 17-acetate (II) the following representative starting materials:

(1) 4α,7α,17α-trimethyl-19-nor-3β,17β-dihydroxy-5α-androstane 17-acetate (II),
(2) 2α,4α,7α,17α-tetramethyl-3α,17β-dihydroxy-5α-androstane 17-acetate (II) and
(3) 2α,4α,7α,17α-tetramethyl-19-nor-3β-17β-dihydroxy-5β-androstane 17-acetate (II), yields, respectively, (1) 4α,7α,17α-trimethyl-19-nor-3β,17β-dihydroxy-5α-androstane (II),
(2) 2α,4α,7α,17α-tetramethyl-3α,17β-dihydroxy-5α-androstane (II), and
(3) 2α,4α,7α,17α-tetramethyl-19-nor-3β,17β-dihydroxy-5β-androstane (II).

EXAMPLE 22

*4,7α,17α-trimethyl-19-nor-17β-hydroxy-4-androsten-3-one 3-thioketal (4,7α,17α - trimethyl-19-nortestosterone-3-thioketal)*

To a solution of 2 g. of 4,7α,17α-trimethyl-19-nor-17β-hydroxy-4-androsten-3-one (II) in 6 ml. of acetic acid cooled to about 10° C., 0.7 ml. of ethanedithiol and 0.7 ml. of borontrifluoride etherate is added. After standing at room temperature for about 20 minutes to 4 hours the reaction mixture is diluted to a volume of about 25 ml. with water and ice. The crystals are collected, washed with water and dried to yield the product, which is recrystallized from a mixture of methanol and methylene chloride to give 4,7α,17α-trimethyl-19-nor-17β-hydroxy-4-androsten-3-one 3-thioketal.

Following the procedure of Example 22 but substituting the following compounds for the starting material employed therein:

(1) 4,7α,17α-trimethyl-17β-hydroxy-4-androsten-3-one (II),
(2) 2α,4,7α,17α-tetramethyl-17β-hydroxy-4-androsten-3-one (II) and
(3) 2α,4,7α,17α-tetramethyl-19-nor-17β-hydroxy-4-androsten-3-one (II), yields respectively, (1) 4,7α,17α-trimethyl-17β-hydroxy-4-androsten-3-one 3-thioketal,
(2) 2α,4,7α,17α-tetramethyl-17β-hydroxy-4-androsten-3-one 3-thioketal and
(3) 2α,4,7α,17α-tetramethyl-19-nor-17β-hydroxy-4-androsten-3-one 3-thioketal.

Following the procedure of Example 22 and the paragraph directly above the present one but substituting as starting materials for the 17β-hydroxy compounds disclosed therein, a corresponding 17-acylate thereof, e.g., a 17-acetate or one of those listed at the end of Example 4, yields the corresponding 3-thioketal counterpart of the aforesaid acylate.

EXAMPLE 23

*4,7α,17α-trimethyl-19-nor-17β-hydroxy-4-androstene (4,7α,17α-trimethylester-4-en-17β-ol) (II)*

To a solution of 1 g. of 4,7α,17α-trimethyl-19-nor-17β-hydroxy-4-androsten-3-one 3-thioketal, 30 ml. of distilled liquid ammonia, 15 ml. of ether and 5 ml. of tetrahydrofuran, 1 g. of sodium metal is added in small pieces. The steroid goes into solution rapidly as the sodium dissolves. The solution is refluxed for about 15 minutes and the blue color is discharged by dropwise addition of absolute ethanol. A fast stream of nitrogen is passed through to aid in evaporating the solvents. After nearly all of the ammonia and other solvents are removed, water is added. The resulting precipitate is collected, washed with water, dried and recrystallized from Skellysolve B to yield 4,7α,17α-trimethyl-19-nor-17β-hydroxy-4-androstene (II).

Following the procedure of Example 23 but omitting tetrahydrofuran also yields 4,7α,17α-trimethyl-19-nor-17β-hydroxy-4-androstene (II).

Following the procedure of Example 23 but substituting the following compounds for the starting material employed therein:

(1) 4,7α,17α-trimethyl-17β-hydroxy-4-androsten-3-one 3-thioketal,
(2) 2α,4,7α,17α-tetramethyl-17β-hydroxy-4-androsten-3-one 3-thioketal and
(3) 2α,4,7α,17α-tetramethyl-19-nor-17β-hydroxy-4-androsten-3-one 3-thioketal, yields, respectively, (1) 4,7α-dimethyl-17β-hydroxy-4-androstene (II),
(2) 2α,4,7α,17α-tetramethyl-17β-hydroxy-4-androstene (II) and
(3) 2α,4,7α,17α-tetramethyl-19-nor-17β-hydroxy-4-androstene (II).

Following the procedure of Example 23 and the two paragraphs immediately preceding the present one but substituting as starting materials for the 17β-hydroxy compounds disclosed therein, a corresponding 17-acylate thereof, e.g., a 17-acetate or one of those listed at the end of Example 4, yields the corresponding 3-thioketal counterpart of the aforesaid acylate.

EXAMPLE 24

*4α,7α,17α-trimethyl-17β-hydroxy-5α-androstan-3-one 3-thioketal*

To a solution of 2 g. of 4α,7α,17α-trimethyl-17β-hydroxy-5α-androstan-3-one (II) (prepared as in Example 19) in 6 ml. of acetic acid cooled to about 10° C., 0.7 ml. of ethanedithiol and 0.7 ml. of borontrifluoride etherate is added. After standing at room temperature for about 20 minutes the reaction mixture is diluted to a volume of about 25 ml. with water and ice. The crystals are collected, washed with water and dried to yield the crude product, which on recrystallization from a mixture of methanol and methylene chloride gives pure 4α,7α,17α-trimethyl-17β-hydroxy-5α-androstan-3-one 3-thioketal.

Following the procedure of Example 24 but substituting the following representative compound for the starting material employed therein:

(1) 2α,4α,7α,17α-tetramethyl-17β-hydroxy-5α-androstan-3-one (II),
(2) 4α,7α,17α-trimethyl-19-nor-17β-hydroxy-5α-androstan-3-one (II),
(3) 2α,4α,7α-trimethyl-19-nor-17β-hydroxy-5α-androstan-3-one (II),
(4) 2α,4α,7α,17α-tetramethyl-19-nor-17β-hydroxy-5α-androstan-3-one (II),
(5) 4α,7α,17α-trimethyl-17β-hydroxy-5β-androstan-3-one (II),
(6) 2α,4α,7α-trimethyl-17β-hydroxy-5β-androstan-3-one (II),
(7) 2α,4α,7α,17α-tetramethyl-17β-hydroxy-5β-androstan-3-one (II),
(8) 4α,7α,17α-trimethyl-19-nor-17β-hydroxy-5β-androstan-3-one (II),
(9) 2α,4α,7α-trimethyl-19-nor-17β-hydroxy-5β-androstan-3-one (II) and
(10) 2α,4α,7α,17α-tetramethyl-19-nor-17β-hydroxy-5β-androstan-3-one (II), yields, respectively, (1) 2α,4α,7α,17α-tetramethyl-17β-hydroxy-5α-androstan-3-one 3-thioketal,
(2) 4α,7α,17α-trimethyl-19-nor-17β-hydroxy-5α-androstan-3-one 3-thioketal,
(3) 2α,4α,7α-trimethyl-19-nor-17β-hydroxy-5α-androstan-3-one 3-thioketal, (4) 2α,4α,7α,17α-tetramethyl-19-nor-17β-hydroxy-5α-androstan-3-one 3-thioketal,
(5) 4α,7α,17α-trimethyl-17β-hydroxy-5β-androstan-3-one 3-thioketal,
(6) 2α,4α,7α-trimethyl-17β-hydroxy-5β-androstan-3-one 3-thioketal,
(7) 2α,4α,7α,17α-tetramethyl-17β-hydroxy-5β-androstan-3-one 3-thioketal,
(8) 4α,7α,17α-trimethyl-17β-hydroxy-5β-androstan-3-one 3-thioketal,
(9) 2α,4α,7α-trimethyl-19-nor-17β-hydroxy-5β-androstan-3-one 3-thioketal, and
(10) 2α,4α,7α,17α-tetramethyl-19-nor-17β-hydroxy-5β-androstan-3-one 3-thioketal.

EXAMPLE 25

*4α,7α,17α-trimethyl-17β-hydroxy-5α-androstane (II)*

To a solution of 1 g. of 4α,7α,17α-trimethyl-17β-hydroxy-5α-androstan-3-one 3-thioketal (obtained in Example 3), 30 ml. of distilled liquid ammonia, 15 ml. of ether and 5 ml. of tetrahydrofuran, 1 g. of sodium metal is added in small pieces. The solution is refluxed for about 15 minutes and the blue color discharged by dropwise addition of absolute ethanol. A rapid stream of nitrogen is passed through the reaction vessel to evaporate the solvents. After removal of most of the ammonia and other solvents, water is added. The resulting precipitate is collected, washed with water, dried and recrystallized from acetone Skellysolve B to yield 4α,7α,17α-trimethyl-17β-hydroxy-5α-androstane (II). Alternatively, purification can be done by chromatography through Florisil followed by recrystallization from acetone Skellysolve B.

Following the procedure of Example 25 but substituting the following representative compounds for the starting material employed therein:

(1) 2α,4α,7α,17α-tetramethyl-17β-hydroxy-5α-androstan-3-one 3-thioketal,
(2) 4α,7α,17α-trimethyl-19-nor-17β-hydroxy-5α-androstan-3-one 3-thioketal,
(3) 2α,4α,7α,17α-tetramethyl-19-nor-17β-hydroxy-5α-androstan-3-one 3-thioketal,
(4) 4α,7α,17α-trimethyl-17β-hydroxy-5β-androstan-3-one 3-thioketal,
(5) 2α,4α,7α,17α-tetramethyl-17β-hydroxy-5β-androstan-3-one 3-thioketal,
(6) 4α,7α,17α-trimethyl-17β-hydroxy-5β-androstan-3-one 3-thioketal,
(7) 2α,4α,7α,17α-tetramethyl-19-nor-17β-hydroxy-5α-androstan-3-one 3-thioketal yields, respectively, (1) 2α,4α,7α,17α-tetramethyl-17β-hydroxy-5α-androstane (II),
(2) 4α,7α,17α-trimethyl-19-nor-17β-hydroxy-5α-androstane (II),
(3) 2α,4α,7α,17α-tetramethyl-19-nor-17β-hydroxy-5α-androstane (II),
(4) 4α,7α,17α-trimethyl-17β-hydroxy-5β-androstane (II),
(5) 2α,4α,7α,17α-tetramethyl-17β-hydroxy-5β-androstane (II),
(6) 4α,7α,17α-trimethyl-19-nor-17β-hydroxy-5β-androstane (II),
(7) 2α,4α,7α,17α-tetramethyl-19-nor-17β-hydroxy-5β-androstane (II).

EXAMPLE 26

*4,7α,17α - trimethyl - 19-nor-17β-hydroxy-4-androsten-3-one 3-thioketal (4,7α,17α-trimethyl-19-nortestosterone 3-thioketal)*

To a solution of 2 g. of 4,7α,17α-trimethyl-19-nor-17β-hydroxy-4-androsten-3-one (II) in 6 ml. of acetic acid cooled to about 10° C., 0.7 ml. of ethanedithiol and 0.7 ml. of borontrifluoride etherate is added. After standing at room temperature for about 20 minutes the reaction mixture is diluted to a volume of about 25 ml. with water and ice. The crystals are collected, washed with water and dried to yield 4,7α,17α-trimethyl-19-nor-17β-hydroxy-4-androsten-3-one 3-thioketal.

Following the procedure of Example 26 but substituting the following compounds for the starting material employed therein:

(1) 2α,4,7α,17α-tetramethyl-17β-hydroxy-4-androsten-3-one (II),
(2) 2α,4,7α,17α-tetramethyl-19-nor-17β-hydroxy-4-androsten-3-one (II)

yields, respectively, (1) 2α,4,7α,17α-tetramethyl-17β-hydroxy-4-androsten-3-one 3-thioketal and
(2) 2α,4,7α,17α-tetramethyl-19-nor-17β-hydroxy-4-androsten-3-one 3-thioketal.

EXAMPLE 27

*4,7α,17α-trimethyl-19-nor-17β-hydroxy-4-androstene (4,7α,17α-trimethylestr-4-en-17β-ol) (II)*

To a solution of 1 g. of 4,7α,17α-trimethyl-19-nor-17β-hydroxy-4-androsten-3-one 3-thioketal, 3 ml. of distilled liquid ammonia, 15 ml. of ether and 5 ml. of tetrahydrofuran, 1 g. of sodium metal is added in small pieces. The steroid goes into solution rapidly as the sodium dissolves. The solution is refluxed for about 15 minutes and the blue color discharged by dropwise addition of absolute ethanol. A fast stream of nitrogen is passed through to aid in evaporating the solvents. After nearly all of the ammonia and other solvents are removed, water is added. The resulting precipitate is collected, washed with water, dried and recrystallized from acetone Skellysolve B to yield 4,7α,17α-trimethyl-19-nor-17β-hydroxy-4-androstene (II). The product can also be purified by chromatography through Florisil and recrystallization from acetone Skellysolve B or methanol.

Following the procedure of Example 27 but omitting tetrahydrofuran also yields 4,7α-dimethyl-19-nor-17β-hydroxy-4-androstene (II).

Following the procedure of Example 27 but substituting the following compounds for the starting material employed therein:

(1) 2α,4,7α,17α-tetramethyl-17β-hydroxy-4-androsten-3-one 3-thioketal and
(2) 2α,4,7α,17α-tetramethyl-19-nor-17β-hydroxy-4-androsten-3-one 3-thioketal yields, respectively, (1) 2α,4,7α,17α-tetramethyl-17β-hydroxy-4-androstene (II) and
(2) 2α,4,7α,17α-tetramethyl-19-nor-17β-hydroxy-4-androstene (II).

EXAMPLE 28

*4α,7α,17α-trimethyl-19-nor-17β-hydroxy-5β-androstane (II)*

A suspension containing 1 g. of 4,7α,17α-trimethyl-19-nor-17β-hydroxy-4-androstene (II) (obtained in Example 27) and 0.2 g. of 5% palladium-on-charcoal in 200 ml. of 95% alcohol is reacted with hydrogen until 1 mole equivalent of hydrogen is consumed. The catalyst is filtered off and the filtrate concentrated to dryness. The residue is purified by chromatography employing a column of Florisil to give 4α,7α,17α-trimethyl-19-nor-17β-hydroxy-5β-androstane (II).

Following the procedure of Example 28 but substituting Adams (platinum dioxide) catalyst for 5% palladium-on-charcoal also yields 4α,7α,17α-trimethyl-19-nor-17β-hydroxy-5β-androstane (II).

Following the procedure of Example 28 but substituting the following representative compounds for the starting material employed therein:

(1) 2α,4,7α,17α-tetramethyl-17β-hydroxy-4-androstene (II) and
(2) 2α,4,7α,17α-tetramethyl-19-nor-17β-hydroxy-4-androstene (II)

yields, respectively, (1) 2α,4α,7α,17α-tetramethyl-17β-hydroxy-5β-androstane (II) and
(2) 2α,4α,7α,17α-tetramethyl-19-nor-17β-hydroxy-5β-androstane (II).

EXAMPLE 29

*4α,7α,17α-trimethyl-3α,17β-dihydroxy-5β-androstane (II)*

To a solution of 1 g. of 4α,7α,17α-trimethyl-17β-hydroxy-5β-androstan-3-one (II) (prepared as in Example 17) in 100 ml. of tetrahydrofuran, 1.5 g. of lithium aluminum tri-t-butoxyhydride is added at about 0° C. with stirring. The reaction mixture is stored at about −15° C. for about 18 hours. Dilute acetic acid is added until the inorganic materials coagulate. The original phase is decanted, dried over magnesium sulfate, filtered, concentrated to dryness, dissolved in an organic solvent and purified by chromatography with a Florisil Column to yield pure 4α,7α,17α-trimethyl - 3α,17β - dihydroxy-5β-androstane (II).

Following the procedure of Example 29 but substituting the following representative starting materials:

(1) 4α,7α,17α-trimethyl-19-nor-17β-hydroxy-5β-androstan-3-one (II),
(2) 2α,4α,7α,17α-tetramethyl-17β-hydroxy-5β-androstan-3-one (II) and
(3) 2α,4α,7α,17α-tetramethyl-19-nor-17β-hydroxy-5β-androstan-3-one (II), yields, respectively, (1) 4α,7α,17α-trimethyl-19-nor-3α,17β-dihydroxy-5β-androstane (II),
(2) 2α,4α,7α,17α-tetramethyl-3α,17β-dihydroxy-5β-androstane (II) and
(3) 2α,4α,7α,17α-tetramethyl-19-nor-3α,17β-dihydroxy-5β-androstane (II).

EXAMPLE 30

*7α,17,17-trimethyl-18-nor-4,13-androstadien-3-one (III)*

A solution of 3 g. of 7α,17α-dimethyl-17β-hydroxy-4-androsten-3-one (II) in 138 ml. of methanol was purged with nitrogen and 83 ml. of 3 N hydrochloric acid added. The solution was refluxed for a period of about 5.5 hours. After about 2 hours of refluxing a considerable quantity of crystals had formed. The reaction mixture was cooled and the crystals collected, washed, dried and recrystallized from aqueous methanol to yield 2.3 g. of 7α,17,17-trimethyl-18-nor-4,13-androstadien-3-one (III), having a melting point of 119 to 120° C., rotation $[\alpha]_D$ +41° (chloroform), $$\lambda_{max}^{alc.}\ 240\ m\mu\ (\epsilon=17{,}050)$$

Nuclear magnetic resonance and infrared spectra support the proposed structure.

*Analysis.*—Calcd. for $C_{21}H_{30}O$: C, 84.51; H, 10.13. Found: C, 83.34; H, 10.24.

Following the procedure of Example 30 but substituting the following representative compounds for the starting material employed therein:

(1) 7α,17α-dimethyl-19-nor-17β-hydroxy-4-androsten-3-one (II),
(2) 7α,17α-dimethyl-3α,17β-dihydroxy-4-androstene (II),
(3) 7α,17α-dimethyl-3β,17β-dihydroxy-4-androstene (II),
(4) 7α,17α-dimethyl-19-nor-3α,17β-dihydroxy-4-androstene (II),
(5) 7α,17α-dimethyl-19-nor-3β,17β-dihydroxy-4-androstene (II),
(6) 7α,17α-dimethyl-17β-hydroxy-4-androstene (II),
(7) 7α,17α-dimethyl-19-nor-17β-hydroxy-4-androstene (II),
(8) 7α,17α-dimethyl-19-nor-17β-hydroxy-5α-androstan-3-one (II),
(9) 7α,17α-dimethyl-3α,17β-dihydroxy-5α-androstane (II),
(10) 7α,17α-dimethyl-19-nor-3β,17β-dihydroxy-5β-androstane (II),
(11) 7α,17α-dimethyl-17β-hydroxy-5α-androstane (II),
(12) 7α,17α-dimethyl-19-nor-17β-hydroxy-5β-androstane (II),
(13) 2α,7α,17α-trimethyl-19-nor-17β-hydroxy-4-androsten-3-one (II),
(14) 2α,7α,17α-trimethyl-3α,17β-dihydroxy-4-androstene (II),
(15) 2α,7α,17α-trimethyl-3β,17β-dihydroxy-4-androstene (II),
(16) 2α,7α,17α-trimethyl-19-nor-3α,17β-dihydroxy-4-androstene (II),
(17) 2α,7α,17α-trimethyl-19-nor-3β,17β-dihydroxy-4-androstene (II),
(18) 2α,7α,17α-trimethyl-17β-hydroxy-4-androstene (II),
(19) 2α,7α,17α-trimethyl-19-nor-17β-hydroxy-4-androstene (II),
(20) 2α,7α,17α-trimethyl-19-nor-17β-hydroxy-5α-androstan-3-one (II),
(21) 2α,7α,17α-trimethyl-3α,17β-dihydroxy-5α-androstane (II),
(22) 2α,7α,17α-trimethyl-19-nor-3β,17β-dihydroxy-5β-androstane (II),
(23) 2α,7α,17α-trimethyl-17β-hydroxy-5α-androstane (II),
(24) 2α,7α,17α-trimethyl-19-nor-17β-hydroxy-5β-androstane (II),
(25) 4,7α,17α-trimethyl-19-nor-17β-hydroxy-4-androsten-3-one (II),
(26) 4,7α,17α-trimethyl-3α,17β-dihydroxy-4-androstene (II),
(27) 4,7α,17α-trimethyl-3β,17β-dihydroxy-4-androstene (II),
(28) 4,7α,17α-trimethyl-19-nor-3α,17β-dihydroxy-4-androstene (II),
(29) 4,7α,17α-trimethyl-19-nor-3β,17β-dihydroxy-4-androstene (II),
(30) 4,7α,17α-trimethyl-17β-hydroxy-4-androstene (II),
(31) 4,7α,17α-trimethyl-19-nor-17β-hydroxy-4-androstene (II),
(32) 4α,7α,17α-trimethyl-19-nor-17β-hydroxy-5α-androstan-3-one (II),
(33) 4α,7α,17α-trimethyl-3α,17β-dihydroxy-5α-androstane (II),
(34) 4α,7α,17α-trimethyl-19-nor-3β,17β-dihydroxy-5β-androstane (II),
(35) 4α,7α,17α-trimethyl-17β-hydroxy-5α-androstane (II),
(36) 4α,7α,17α-trimethyl-19-nor-17β-hydroxy-5β-androstane (II),
(37) 2α,4,7α,17α-tetramethyl-19-nor-17β-hydroxy-4-androsten-3-one (II),
(38) 2α,4,7α,17α-tetramethyl-3α,17β-dihydroxy-4-androstene (II),
(39) 2α,4,7α,17α-tetramethyl-3β,17β-dihydroxy-4-androstene (II),
(40) 2α,4,7α,17α-tetramethyl-19-nor-3α,17β-dihydroxy-4-androstene (II),
(41) 2α,4,7α,17α-tetramethyl-19-nor-3β,17β-dihydroxy-4-androstene (II),
(42) 2α,4,7α,17α-tetramethyl-17β-hydroxy-4-androstene (II),
(43) 2α,4,7α,17α-tetramethyl-19-nor-17β-hydroxy-4-androstene (II),

(44) 2α,4α,7α,17α-tetramethyl-19-nor-17β-hydroxy-5α-androstan-3-one (II),
(45) 2α,4α,7α,17α-tetramethyl-3α,17β-dihydroxy-5α-androstane (II),
(46) 2α,4α,7α,17α-tetramethyl-19-nor-3β,17β-dihydroxy-5β-androstane (II),
(47) 2α,4α,7α,17α-tetramethyl-17β-hydroxy-5α-androstane (II) and
(48) 2α,4α,7α,17α-tetramethyl-19-nor-17β-hydroxy-5β-androstane (II),
yields, respectively, (1) 7α,17,17-trimethyl-18,19-dinor-4,13-androstadien-3-one (III),
(2) 7α,17,17-trimethyl-18-nor-3α-hydroxy,4,13-androstadiene (III),
(3) 7α,17,17-trimethyl-18-nor-3β-hydroxy-4,13-androstadiene (III),
(4) 7α,17,17-trimethyl-18,19-dinor-3α-hydroxy-4,13-androstadiene (III),
(5) 7α,17,17-trimethyl-18,19-dinor-3β-hydroxy-4,13-androstadiene (III),
(6) 7α,17,17-trimethyl-18-nor-4,13-androstadiene (III),
(7) 7α,17,17-trimethyl-18,19-dinor-4,13-androstadiene (III),
(8) 7α,17,17-trimethyl-18,19-dinor-5α-androst-13-en-3-one (III),
(9) 7α,17,17-trimethyl-18-nor-3α-5α-androst-13-ene (III),
(10) 7α,17,17-trimethyl-18,19-dinor-3β-hydroxy-5β-androst-13-en (III),
(11) 7α,17,17-trimethyl-18-nor-5α-androst-13-ene (III),
(12) 7α,17,17-trimethyl-18,19-dinor-5β-androst-13-ene (III),
(13) 2α,7α,17,17-tetramethyl-18,19-dinor-4,13-androstadien-3-one (III),
(14) 2α,7α,17,17-tetramethyl-18-nor-3α-hydroxy-4,13-androstadiene (III),
(15) 2α,7α,17,17-tetramethyl-18-nor-3β-hydroxy-4,13-androstadiene (III),
(16) 2α,7α,17,17-tetramethyl-18,19-dinor-3β-hydroxy-4,13-androstadiene (III),
(17) 2α,7α,17,17-tetramethyl-18,19-dinor-3β-hydroxy-4,13-androstadiene (III),
(18) 2α,7α,17,17-tetramethyl-18-nor-4,13-androstadiene (III),
(19) 2α,7α,17,17-tetramethyl-18,19-dinor-4,13-androstadiene (III),
(20) 2α,7α,17,17-tetramethyl-18,19-dinor-5α-androst-13-en-3-one (III),
(21) 2α,7α,17,17-tetramethyl-18-nor-3α-hydroxy-5α-androst-13-ene (III),
(22) 2α,7α,17,17-tetramethyl-18,19-dinor-3β-hydroxy-5β-androst-13-ene (III),
(23) 2α,7α,17,17-tetramethyl-18-nor-5α-androst-13-ene (III),
(24) 2α,7α,17,17-tetramethyl-18,19-dinor-5β-androst-13-ene (III),
(25) 4,7α,17,17-tetramethyl-18,19-dinor-4,13-androstadien-3-one (III),
(26) 4,7α,17,17-tetramethyl-18-nor-3α-hydroxy-4,13-androstadiene (III),
(27) 4,7α,17,17-tetramethyl-18-nor-3β-hydroxy-4,13-androstadiene (III),
(28) 4,7α,17,17-tetramethyl-18,19-dinor-3α-hydroxy-4,13-androstadiene (III),
(29) 4,7α,17,17-tetramethyl-18,19-dinor-3β-hydroxy-4,13-androstadiene (III),
(30) 4,7α,17,17-tetramethyl-18-nor-4,13-androstadiene (III),
(31) 4,7α,17,17-tetramethyl-18,19-dinor-4,13-androstadiene (III),
(32) 4α,7α,17,17-tetramethyl-18,19-dinor-5α-androst-13-en-3-one (III),
(33) 4α,7α,17,17-tetramethyl-18-nor-3α-hydroxy-5α-androst-13-ene (III),
(34) 4α,7α,17,17-tetramethyl-18,19-dinor-3β-hydroxy-5β-androst-13-ene (III),
(35) 4α,7α,17,17-tetramethyl-18-nor-5α-androst-13-ene (III),
(36) 4α,7α,17,17-tetramethyl-18,19-dinor-5β-androst-13-ene (III),
(37) 2α,4,7α,17,17-pentamethyl-18,19-dinor-4,13-androstadiene-3-one (III),
(38) 2α,4,7α,17,17-pentamethyl-18-nor-3α-hydroxy-4,13-androstadiene (III),
(39) 2α,4,7α,17,17-pentamethyl-18-nor-3β-hydroxy-4,13-androstadiene (III),
(40) 2α,4,7α,17,17-pentamethyl-18,19-dinor-3α-hydroxy-4,13-androstadiene (III),
(41) 2α,4,7α,17,17-pentamethyl-18,19-dinor-3β-hydroxy-4,13-androstadiene (III),
(42) 2α,4,7α,17,17-pentamethyl-18-nor-4,13-androstadiene (III),
(43) 2α,4,7α,17,17-pentamethyl-18,19-dinor-4,13-androstadiene (III),
(44) 2α,4α,7α,17,17-pentamethyl-18,19-dinor-5α-androst-13-en-3-one (III),
(45) 2α,4α,7α,17,17-pentamethyl-18-nor-3α-hydroxy-5α-androst-13-ene (III),
(46) 2α,4α,7α,17,17-pentamethyl-18,19-dinor-3β-hydroxy-5β-androst-13-one (III),
(47) 2α,4α,7α,17,17-pentamethyl-18-nor-5α-androst-13-ene (III), and
(48) 2α,4α,7α,17,17-pentamethyl-18,19-dinor-5β-androst-13-ene (III).

EXAMPLE 31

*7α,17,17-trimethyl-18-nor-3α-hydroxy - 4,13-androstadiene 3-dihydropyranyl ether (III)*

To 1.8 g. of 7α,17,17-trimethyl-18-nor-3α-hydroxy-4,13-androstadiene (obtained in accordance with the procedure of Example 40) suspended in 10 ml. of dihydropyran and 50 ml. of ether, 100 mg. of p-toluenesulfonic acid is added. The ether solution is stirred for about 16 hours, extracted successively with sodium bicarbonate solution, saturated sodium chloride solution, dried over anhydrous sodium sulfate and evaporated to dryness under reduced pressure to yield a residue comprising 7α,17,17-trimethyl-18-nor-3α-hydroxy-4,13-androstadiene 3 - dihydropyranyl ether (III). Crystallization from aqueous methanol affords pure 7α,17,17-trimethyl - 18 - nor - 3α - hydroxy-4,13-androstadiene 3-dihydropyranyl ether.

Following the procedure of Example 31 but substituting the following representative compounds for the starting material employed therein:
(1) 7α,17,17-trimethyl-18,19-dinor-3β-hydroxy-4,13-androstadiene (III),
(2) 7α,17,17-trimethyl-18-nor-3α-hydroxy-5α-androst-13-ene (III),
(3) 7α,17,17-trimethyl-18,19-dinor-3β-hydroxy-5β-androst-13-ene (III),
(4) 2α,7α,17,17-tetramethyl-18-nor-3α-hydroxy-4,13-androstadiene (III),
(5) 2α,7α,17,17-tetramethyl-18,19-dinor-3β-hydroxy-4,13-androstadiene (III),
(6) 2α,7α,17,17-tetramethyl-18-nor-30α-hydroxy-5α-androst-13-ene (III),
(7) 2α,7α,17,17-tetramethyl-18,19-dinor-3β-hydroxy-5β-androst-13-ene (III),
(8) 4,7α,17,17-tetramethyl-18-nor-3α-hydroxy-4,13-androstadiene (III),
(9) 4,7α,17,17-tetramethyl-18,19-dinor-3β-hydroxy-4,13-androstadiene (III),
(10) 4α,7α,17,17-tetramethyl-18-nor-3α-hydroxy-5α-androst-13-ene (III),
(11) 4α,7α,17,17-tetramethyl-18,19-dinor-3β-hydroxy-5β-androst-13-ene (III),
(12) 2α,4α7α,17,17-pentamethyl-18-nor-3α-hydroxy-4,13-androstadiene (III),

(13) 2α,4α,7α,17,17-pentamethyl-18,19-dinor-3β-hydroxy-4,13-androstadiene (III) and
(14) 2α,4α,7α,17,17-pentamethyl-18-nor-5α-androst 13-ene (III)

yields the corresponding 3-dihydropyranyl ethers.

EXAMPLE 32

*7α,17,17-trimethyl-18-nor-3α-hydroxy-4,13 - androstadiene 3-acetate (III)*

A mixture of 0.5 g. of 7α,17,17-trimethyl-18-nor-3α-hydroxy-4,13-androstadiene, 0.5 ml. of acetic anhydride and 0.5 ml. of pyridine is refluxed for about 4 hours. Ice and water are added and the product is extracted with ether, washed with dilute hydrochloric acid, water, dilute sodium hydroxide, and again with water, and dried over sodium sulfate. The solvent is removed and the residue crystallized from aqueous methanol giving pure 7α,17,17-trimethyl-18-nor - 3α - hydroxy - 4,13 - androstadiene 3-acetate.

Following the procedure of Example 32 but substituting the following representative compounds for the starting material employed therein:
(1) 7α,17,17-trimethyl-18,19-dinor-3β-hydroxy-4,13-androstadiene (III),
(2) 7α,17,17-trimethyl-18-nor-3α-hydroxy-5α-androst-13-ene (III),
(3) 7α,17,17-trimethyl-18,19-dinor-3β-hydroxy-5β-androst-13-ene (III),
(4) 2α,7α,17,17-tetramethyl-18-nor-3α-hydroxy-4,13-androstadiene (III),
(5) 2α,7α,17,17-tetramethyl-18,19-dinor-3β-hydroxy-4,13-androstadiene (III),
(6) 2α,7α,17,17-tetramethyl-18-nor-3α-hydroxy-5α-androst-13-ene (III),
(7) 2α,7α,17,17-tetramethyl-18,19-dinor-3β-hydroxy-5β-androst-13-ene (III),
(8) 4,7α,17,17-tetramethyl-18-nor-3α-hydroxy-4,13-androstadiene (III),
(9) 4,7α,17,17-tetramethyl-18,19-dinor-3β-hydroxy-4,13-androstadiene (III),
(10) 4α,7α,17,17-tetramethyl-18-nor-3α-hydroxy-5α-androst-13-ene (III),
(11) 4α,7α,17,17-tetramethyl-18,19-dinor-3β-hydroxy-5β-androst-13-ene (III),
(12) 2α,4α,7α,17,17-pentamethyl-18-nor-3α-hydroxy-4,13-androstadiene (III),
(13) 2α,4α,7α,17,17-pentamethyl-18-19,-dinor-3β-hydroxy-4,13-androstadiene (III) and
(14) 2α,4α,7α,17,17-pentamethyl-18-nor-5α-androst-13-ene (III), yields the corresponding 3-acetates.

In the same manner as in Example 32, the 3-cyclopentylpropionate, hydrocinnamate, butyrate, isobutyrate, valerate, isovalerate, hexanoate, octanoate, phenylacetate and other like esters of the representative compounds listed after Example 32 are prepared by reaction of the corresponding 3α- and 3β-hydroxy compounds with the appropriate acid anhydride or acid halide.

As indicated heretofore, the compounds of this invention are useful in therapy for their anabolic, anti-fertility, anti-androgenic, anti-estrogenic and hypocholesteremic (i.e., reducing blood cholesterol) activities, and particularly in the treatment of atherosclerosis and arteriosclerosis. Administration to mammals, including humans, depends on the particular compound involved, severity of the condition being treated and the individual's response to the medication. In general, a dose of about 5 to 1000 mg. of each of the compounds exemplified in Examples 1 to 32 and embraced within Formula III is given one to three times a day, and preferably about 50 to about 500 mg. thereof one to three times a day, in the treatment of conditions incident to the foregoing activities when incorporated in conventional pharmaceutical compositions.

The following examples illustrate the incorporation of the active ingredients of this invention in pharmaceutical formulation.

EXAMPLE 33

*Compressed tablets*

A lot of 10,000 compressed tablets, each containing 10 mg. of 17α,17,17-trimethyl-18-nor-4,13-anrostadien-3-one is prepared from the following ingredients:

|  | G. |
|---|---|
| 17α,17,17 - trimethyl - 18-nor-4,13-androstadien-3-one | 100 |
| Dicalcium phosphate | 2500 |
| Methylcellulose, USP (15 cps.) | 65 |
| Talc, bolted | 450 |
| Calcium stearate, fine powder | 35 |

The 17α,17,17 - trimethyl-18-nor-4,13-androstadien-3-one and dicalcium phosphate are mixed well, granulated with 7.5% solution of methylcellulose in water, passed through a No. 8 screen and dried at 120° F. The dried granules are passed through a No. 12 screen, mixed thoroughly with the talc and stearate and compressed into tablets.

One tablet is given 3 times daily in the oral treatment of hypercholesteremia in adult humans.

EXAMPLE 34

*Hard gelatin capsules*

A lot of 1000 hard gelatin capsules, each containing 100 mg. of 2α,7α,17,17-tetramethyl-18-nor-4,13-androstadien-3-one is prepared from the following ingredients:

|  | G. |
|---|---|
| 2α,7α,17,17 - tetramethyl - 18-nor-4,13-androstadien-3-one, micronized | 100 |
| Lactose | 150 |
| Calcium stearate | 2 |
| Talc | 3 |

The lactose, talc and stearate are mixed well and the 2α,7α,17,17-tetramethyl-18-nor-4,13-androstadien - 3-one incorporated into the mixture. The whole is mixed well and filled into two-piece hard gelatin capsules.

The capsules are used in the reduction of cholesterol levels in adult humans at a dose of 3–6 capsules daily.

EXAMPLE 35

*Soft gelatin capsules*

A batch of 1000 soft gelatin capsules, each containing 50 mg. of 4,7α,17,17-tetramethyl-18-nor-4,13-androstadien-3-one and corn oil is prepared from the following materials:

|  | G. |
|---|---|
| 4,7α,17,17-tetramethyl-18-nor - 4,13 - androstadien-3-one, micronized | 50 |
| Corn oil | q.s. |

A uniform dispersion of the active ingredient in the corn oil is prepared and the dispersion filled into soft gelatin capsules by conventional means.

One capsule is given twice a day in the treatment of hypercholesteremia in adult humans.

EXAMPLE 36

*Aqueous oral suspension*

An aqueous oral suspension containing in each 5 ml. 500 mg. of 2α,4,7α,17,17-pentamethyl-18-nor-4,13-androstadien-3-one is prepared from the following materials:

| | | |
|---|---|---|
| 2α,4,7α,17,17-pentamethyl - 18 - nor - 4,13-androstadien-3-one, micronized | g-- | 1000 |
| Methylparaben, USP | g-- | 7.5 |
| Propylparaben, USP | g-- | 2.5 |
| Saccharin sodium | g-- | 12.5 |
| Cyclamate sodium | g-- | 2.5 |
| Glycerin | ml-- | 3000 |
| Tragacanth powder | g-- | 100 |

Orange oil flavor _____ g__ 10
F. D. and C. orange dye _____ g__ 7.5
Deionized water, q.s. to 10,000 ml.

One teaspoonful (5 ml.) 3 times daily is employed in the treatment of hypercholesteremia in adult humans.

EXAMPLE 37

*Aqueous suspension for injection*

A suspending vehicle is prepared from the following materials:

|   | G. |
|---|---|
| Polyethylene glycol 4000 | 30 |
| Potassium chloride | 11.2 |
| Polysorbate 80 | 2 |
| Methylparaben | 1.8 |
| Propylparaben | 0.2 |
| Water for injection, q.s. to 1000 ml. | |

The parabens are added to a major portion of the water and are dissolved therein by stirring and heating to 65° C. The resulting solution is cooled to room temperature and the remainder of the ingredients are added and dissolved. The balance of the water to make up the required volume is then added and the solution sterilized by filtration. The sterile vehicle thus prepared is then mixed with 50 g. of 7α,17,17-trimethyl-18,19-dinor-4,13-androstadien-3-one which has been previously reduced to a particle size less than about 10 microns and sterilized with ethylene oxide gas. The mixture is passed through a sterilized colloid mill and filled under aseptic conditions into sterile containers which are then sealed.

Each milliliter of this suspension contains 50 mg. of 7α,17,17-trimethyl - 18,19 - dinor - 4,13-androstadien-3-one. The suspension is used intramuscularly in 1-ml. doses in the treatment of hypercholesteremia.

We claim:
1. 2α,7α,17,17-tetramethyl-18-nor-4,13-androstadien-3-one.
2. 2α,7α,17,17-tetramethyl-18,19-dinor-4,13-androstadien-3-one.
3. 4,7α,17,17-tetramethyl-18-nor-4,13-androstadien-3-one.
4. 4,7α,17,17-tetramethyl-18,19-dinor-4,13-androstadien-3-one.
5. Compounds of the formula

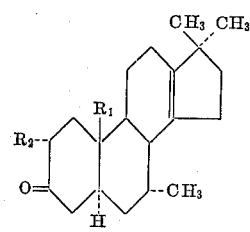

wherein $R_1$ and $R_2$ are selected from the group consisting of hydrogen and methyl.

6. 7α,17,17-trimethyl-18-nor-5α-androstan-13-en-3-one.
7. 7α,17,17-trimethyl-18,19-dinor-5α-androstan-13-en-3-one.
8. Compounds of the formula

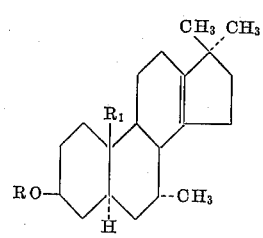

wherein $R_1$ is selected from the group consisting of hydrogen and methyl and R is selected from the group consisting of hydrogen and the acyl radical of a hydrocarbon carboxylic acid containing from one to twelve carbon atoms, inclusive.

9. 7α,17,17-trimethyl-18-nor-3β-hydroxy-5α-androstan-13-ene.
10. 7α,17,17-trimethyl-18,19-dinor-3β-hydroxy-5α-androstan-13-ene-3-acetate.
11. Compounds of the formula

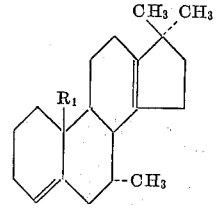

wherein $R_1$ is selected from the group consisting of hydrogen and methyl.

12. 7α,17,17-trimethyl-18,19-dinor-4,13-androstadiene.
13. A therapeutic composition comprising: about 5 to about 1000 mg. of a compound selected from the group consisting of those having the formulae

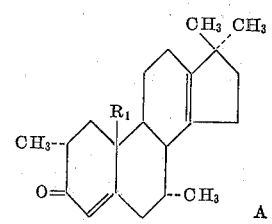
A

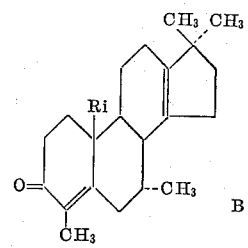
B

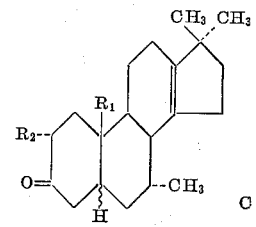
C

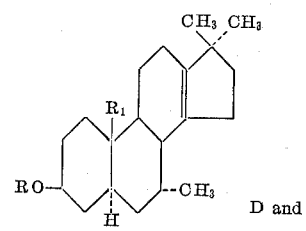
D and

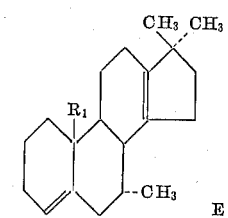
E wherein R is selected from the group consisting of hydrogen and the acyl radical of a hydrocarbon carboxylic acid containing from one through twelve carbon atoms and $R_1$ and $R_2$ are selected from the group consisting of hydrogen and methyl, dispersed in a pharmaceutical carrier.

14. A method for reducing blood cholesterol in mammals comprising: administering to mammals a compound selected from the group consisting of those having the formulae

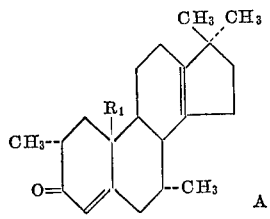
A

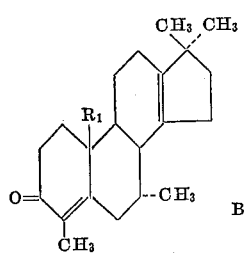
B

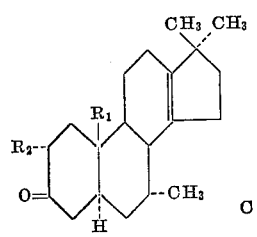
C

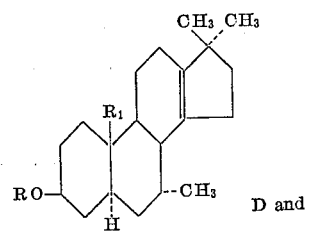
D and

E wherein R is selected from the group consisting of hydrogen and the acyl radical of a hydrocarbon carboxylic acid containing from one through twelve carbon atoms and $R_1$ and $R_2$ are selected from the group consisting of hydrogen and methyl.

References Cited

Caspi et al., "Canadian Jour. Chem." (1963), vol. 41, pp. 2294–95 relied on.
Dorfman, "Steroids" (1963), p. 191.
Segaloff et al., "Steroids" (1964), No. 3 pp. 436–38.

ELBERT ROBERTS, *Primary Examiner.*

LEWIS GOTTS, *Examiner.*

UNITED STATES PATENT OFFICE
CERTIFICATE OF CORRECTION

Patent No. 3,341,411                            September 12, 1967

J Allan Campbell et al.

It is hereby certified that error appears in the above numbered patent requiring correction and that the said Letters Patent should read as corrected below.

Column 1, lines 15 to 25, the formula should appear as shown below instead of as in the patent:

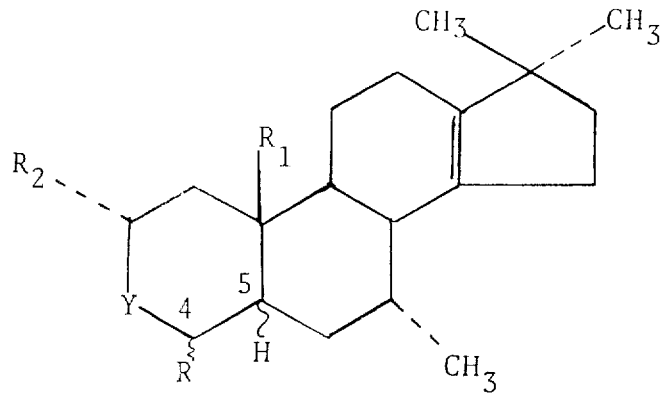

same column 1, lines 38 to 40, the formula should appear as shown below instead of as in the patent:

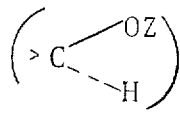          and          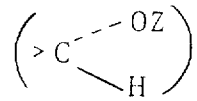

column 3, line 27, for "butyoxyhydride" read -- butoxyhydride --; column 5, line 3, for "Forumla" read -- Formula --; column 8, line 10, for "toluenesulfanic" read -- toluenesulfonic --; line 23, for "hydroxycompounds" read -- hydroxy compounds --; column 10, line 32, for "1200" read -- 1220 --; column 14, line 45, for "-3-" read -- -3-one --; line 71, for "-3-one (II), yields, respectively," read -- -3-one 3-thioketal. --; column 17, line 32, for "dimenthyl" read -- dimethyl --; column 18, line 8, for "triemthyl" read -- trimethyl --; line 11, for "dimehyl" read -- dimethyl --; column 20, line 51, for "(II)" read -- (II´) --; column 22, lines 7 and 8, for "-androsane" read ---andro-stane --; column 29, line 15, for "hydroxy, 4,13-" read -- hydroxy-4,13- --; line 27, for "3α -5α-" read -- 3α-hydroxy-5α- --; line 60, for "tetamethyl" read -- tetramethyl --; column 30, line 62, for "-30α-" read -- -3α- --; column 31, line 48, for "-18-19,-" read -- -18-19- --; column 32, line 7, for "anrostadien-" read -- androstadien- --; column 34, lines 43 to 54, the formula should appear as shown below instead of as in the patent:

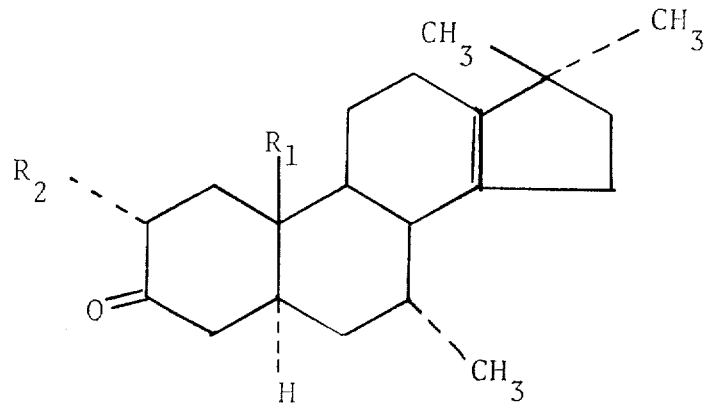

Signed and sealed this 18th day of March 1969.

(SEAL)
Attest:

EDWARD M. FLETCHER, JR.
Attesting Officer

EDWARD J. BRENNER
Commissioner of Patents